(12) United States Patent
Ghetie

(10) Patent No.: US 12,244,732 B2
(45) Date of Patent: Mar. 4, 2025

(54) SYSTEM AND METHODS FOR CONFIDENTIAL COMPUTING

(71) Applicant: SDG Logic Inc., Hillsboro, OR (US)

(72) Inventor: Sergiu Ghetie, Hillsboro, OR (US)

(73) Assignee: SDG Logic Inc., Hillsboro, OR (US)

(\*) Notice: Subject to any disclaimer, the term of this patent is extended or adjusted under 35 U.S.C. 154(b) by 500 days.

(21) Appl. No.: 17/367,020

(22) Filed: Jul. 2, 2021

(65) Prior Publication Data

US 2022/0006653 A1 Jan. 6, 2022

Related U.S. Application Data

(60) Provisional application No. 63/047,674, filed on Jul. 2, 2020.

(51) Int. Cl.

| | |
|---|---|
| *G06F 21/57* | (2013.01) |
| *H04L 9/06* | (2006.01) |
| *H04L 9/08* | (2006.01) |
| *H04L 9/32* | (2006.01) |
| *H04L 9/40* | (2022.01) |

(52) U.S. Cl.
CPC .......... *H04L 9/3263* (2013.01); *G06F 21/575* (2013.01); *H04L 9/0643* (2013.01); *H04L 9/0825* (2013.01); *H04L 9/0894* (2013.01); *H04L 9/3247* (2013.01); *H04L 9/3278* (2013.01); *H04L 63/0428* (2013.01); *H04L 63/0876* (2013.01)

(58) Field of Classification Search
CPC ... H04L 9/3263; H04L 9/0643; H04L 9/0825; H04L 9/0894; H04L 9/3247; H04L 9/3278; H04L 63/0428; H04L 63/0876; H04L 2209/26; H04L 9/002; G06F 21/575; G06F 21/57; G06F 21/572
See application file for complete search history.

(56) References Cited

U.S. PATENT DOCUMENTS

| | | | |
|---|---|---|---|
| 9,989,043 B2 \* | 6/2018 | Lee | G06F 21/72 |
| 10,516,533 B2 | 12/2019 | Mannan et al. | |
| 11,394,543 B2 \* | 7/2022 | Collier | G06F 21/602 |
| 2004/0025010 A1 \* | 2/2004 | Azema | G06F 12/1408 |
| | | | 713/156 |

(Continued)

*Primary Examiner* — Shaqueal D Wade-Wright
(74) *Attorney, Agent, or Firm* — Polsinelli LLP

(57) ABSTRACT

Systems, apparatuses, methods, and computer-readable media for implementing confidential computing of one or more computing systems and/or devices using component authentication and data encryption with integrity and anti-replay mechanisms are disclosed. In some examples, the systems, apparatuses, methods, and computer-readable media described herein can perform various techniques, including one or more secure boot processes, component and data authentication, and data encryption with integrity and anti-replay, among other secure techniques. One implementation may include executing secure boot process based on authentication of a device identifier stored in a secure physical object of a processing device. Another implementation may include encrypting and storing a counter value corresponding to a cache line and generating an integrity tag value replacing error correction code bits associated with the cache line with the generated cache line tag value.

32 Claims, 15 Drawing Sheets

(56) References Cited

U.S. PATENT DOCUMENTS

| | | | |
|---|---|---|---|
| 2007/0047735 A1* | 3/2007 | Celli | H04L 9/0825 |
| | | | 380/30 |
| 2012/0297175 A1* | 11/2012 | Ekberg | G06F 21/575 |
| | | | 713/1 |
| 2012/0311314 A1* | 12/2012 | Cumming | G06F 21/575 |
| | | | 713/2 |
| 2013/0145140 A1* | 6/2013 | Hsien | H04L 9/0866 |
| | | | 713/2 |
| 2016/0065375 A1* | 3/2016 | Kahana | G06F 21/575 |
| | | | 713/189 |
| 2018/0069852 A1 | 3/2018 | Buendgen et al. | |
| 2019/0207813 A1* | 7/2019 | Uehara | H04L 9/3239 |

* cited by examiner

SYSTEM AND METHODS FOR CONFIDENTIAL COMPUTING

CROSS-REFERENCE TO RELATED APPLICATIONS

This application claims the benefit of U.S. Provisional Application No. 63/047,674 filed Jul. 2, 2020, which is hereby incorporated by reference for all purposes.

TECHNICAL FIELD

The present disclosure generally relates to confidential computing systems with secure operation and communication capabilities.

BACKGROUND

As computing devices become more ubiquitous, the need for securing the data and operation of such devices from attacks and/or attempts to access and control the devices increases. Confidential computing may refer to secure (e.g., physically secure) computing where a local or remote user or device trusts that computing resources can securely communicate with the local or remote user device and between themselves. In addition, computing resources are increasingly remotely located and controlled away from a consumer of the computing resources. For example, a corporation may store data and/or host and execute applications that utilize that data on computing systems located in a datacenter, accessible through some type of network connection between the corporation location and the datacenter. Such datacenters are often controlled and operated by a third party entity, such as a cloud service provider (CSP), separate from the consumer of the hosted applications such that the user trusts the third party operator to securely maintain the hosted applications and data. However, these critical infrastructure, cloud, and edge services of the datacenters are particularly vulnerable to large-scale attacks that may try and take control of these systems or to inflict permanent denial of service as part of cyber-security warfare. Protecting against malicious entities requires hardware and software engineers to balance security, runtime, and memory constraints, among others, which may result in some computing devices and systems being vulnerable to attacks and generally untrustworthy.

BRIEF SUMMARY

Disclosed are systems, apparatuses, methods, and computer-readable media for implementing confidential computing of one or more computing systems and/or devices using component authentication and data encryption with integrity and anti-replay mechanisms. In some examples, the systems, apparatuses, methods, and computer-readable media described herein can perform various techniques, including one or more secure boot processes, component and data authentication, and data encryption with integrity and anti-replay, among other secure techniques. In one particular example, a component of a computing system, such as a processing device, may be configured as a security intelligent controller for the system. The security intelligent controller may be configured to execute or otherwise perform the secure boot, authentication, and encryption with integrity and anti-replay techniques described herein. Further, the techniques may allow the security intelligent controller to securely store and retrieve data from untrusted components of the computing system, also referred to herein as "security unenlightened devices". The secure boot processes, the authentication and encryption with integrity and anti-replay techniques, and the other techniques described herein reduce the number of devices or systems that are to be trusted for secure operation to provide a confidential computing environment.

One implementation may include a method for secure computing comprising the operations of decrypting, by a processing device and using a private key of a first public/private key pair, an encrypted block of data received from a first computing device, the encrypted block of data comprising an identifier of the processing device and verifying the identifier of the processing device matches a value encoded based on a secure physical object of the processing device. The method may also include the operation of executing, by the processing device and based on verifying the identifier of the processing device and performing the digital signature verification (secure boot) of a secure program using the public key of a second (session) public/private key pair, the secure program to secure boot the processing device. In some cases, the second public/private key pair is different from the first public/private key pair.

Another implementation may include a method for secure data management in a computing device comprising the operations of storing, by a processing device in a cache tree configuration, a counter value corresponding to a cache line of a cache memory structure, and generating a cache line tag value based on a one-way hash of the counter value, a plaintext or ciphertext block, and an address value. The method may further include the operation of replacing one or more stored error correction code (ECC) bits associated with the cache line with the generated cache line tag value.

Other methods, systems, and processing devices are described herein.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
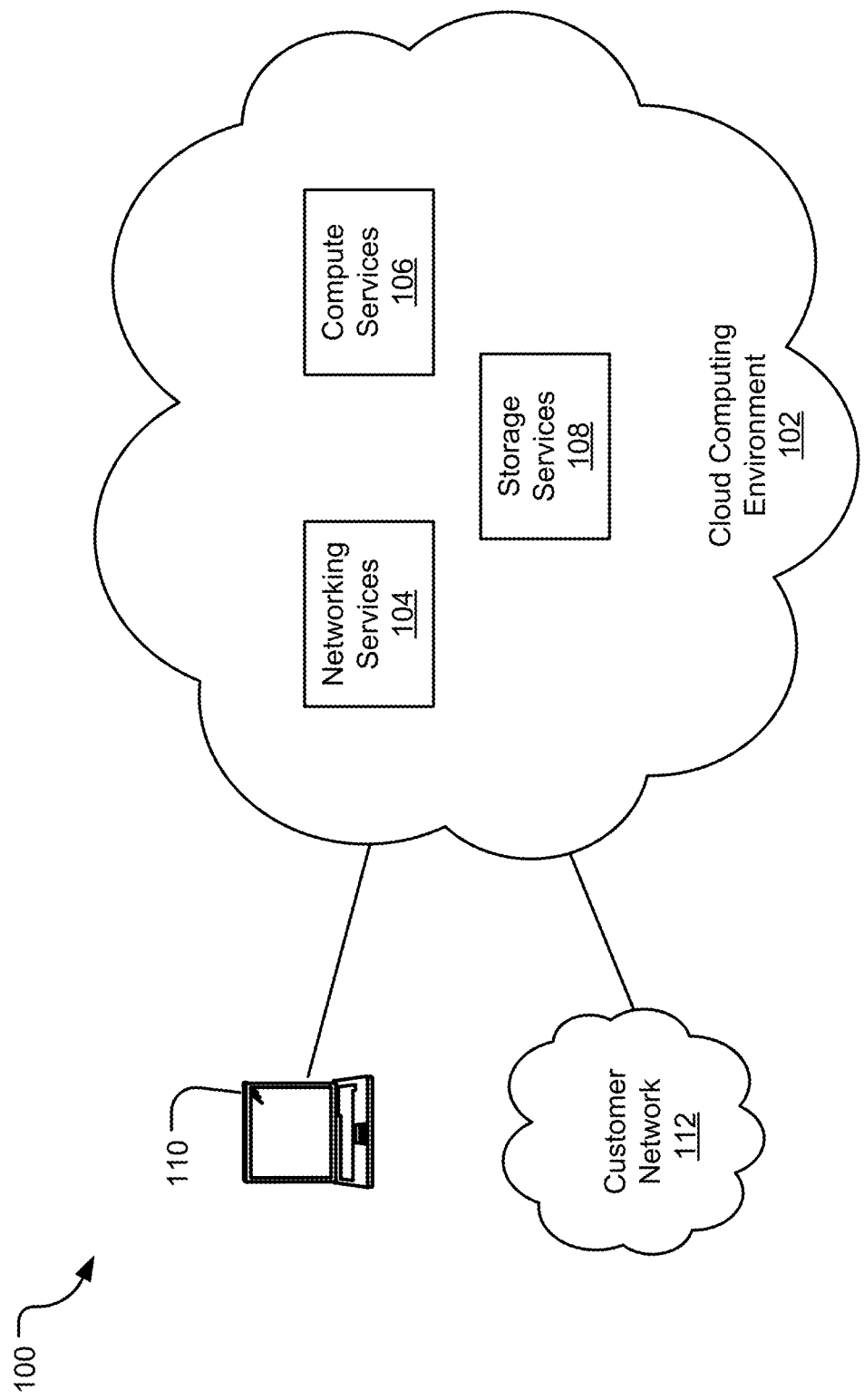
FIG. 1 is a schematic diagram illustrating an example of a cloud computing environment, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application.

Aspects of the present disclosure involve a processing device that implements or executes security controller functionality for a computing system or environment. The processing device can also be referred to herein as a "security intelligent controller." The processing device may be any type of computing device configurable to implement any of the security features described herein and may include, but is not limited to, a central processing unit (CPU), microprocessor device, an accelerator device, a graphics processing unit (GPU), a neural processing unit (NPU), a field-programmable gate array (FPGA), a video card, a sound card, memory controllers, digital signal processor (DSP), vision processing unit (VPU), artificial Intelligence (AI) accelerators, and/or any other processing device or devices in a computer that interprets and manipulates data. Components of the computing system or environment other than the security intelligent controller may include devices on which a security controller is not executed but may otherwise be in communication with the security intelligent controller to receive and store data. Such components may be referred to herein as "security unenlightened devices" and may include, but are not limited to, storage devices (e.g., SSDs, HDDs), dynamic random-access memory (DRAM) or persistent memory devices connected to other system devices via point-to-point interfaces or fabrics, and the like. Through the processes described herein, data stored with security unenlightened devices may be encrypted with integrity and anti-replay capabilities to secure the data from security breaches.

In some examples, the computing system or environment may include a plurality of processing devices, of which one or more of the processing devices may be configured as a security intelligent controller. In such examples, using one or more of the methods (also referred to as processes) described herein, one or more of the other processing devices may be configured as secondary security intelligent controller(s) controllable by the security intelligent controller of the system.

Security intelligent controllers of the computing system may execute one or more security features to ensure secure communication with local or remote computing devices and between themselves. Such features may include one or more secure booting procedures, authentication of components of the computing environment, and/or data encryption with integrity and anti-replay capabilities. In one example, authentication of the security intelligent controller (and other components of the computing system) may include authenticating the components with a remote device or a device that is remote from the security intelligent controller or otherwise not within the computing system. Such remote devices may include any computing device communicating with the security intelligent controller through a network connection. In another example, the authentication of the security intelligent controller (and other components of the computing system) may include authenticating the components with a local computing device or a device that is in communication with the security intelligent controller through a wired connected.

The security features implemented by the security intelligent controller of the computing system may drastically reduce the trusted computing components of a system. For example, the security features may eliminate the need to trust cloud service providers (CSPs), original design manufacturers (ODMs), original equipment manufacturers (OEMs), network infrastructures, and other parties in the supply chain for a computing device or system. Rather, through the security features described herein, users of computing systems, whether local to the computing system or remote, may trust the security intelligent controller to maintain security over the user's data and the operation of the computing system.

In some examples, the security intelligent controller may include a public identity that is used to authenticate the security intelligent controller. In one illustrative example, the public identity may be a binary number that is accessible by privileged software via an opt-in mechanism in the Basic Input Output System (BIOS) executed by the security intelligent controller. Examples of such public identities may include a public processor identification number (PPIN) or a serial number of the security intelligent controller device. The public identity may be securely maintained through one or more secure physical objects of the security intelligent controller.

In some aspects, the public identity may be a value that is programmed in one or more fuses that are embedded within the security intelligent controller. Fuses are physical objects made of a material (e.g., metal) and embedded in the silicon of the security intelligent controller. The fuses may be one-time programmable to retain an opposite value to the one with which they are manufactured (e.g. fuses manufactured as a logical '0' can only be programmed one time to a logical '1'). Although fuse programming is intended to be lockable (or unchangeable), advanced protection mechanisms such as the one described herein may be utilized to prevent against hardware security vulnerabilities affecting the programming lock mechanism.

In some aspects, the public identity of the security intelligent controller may additionally or alternatively be stored in lockable on-chip, non-volatile memory. In some cases, the lockable on-chip, non-volatile memory is a physical object embedded in the silicon of the security intelligent controller that is multiple times programmable, but may also employ a locking mechanism that prevents further programming once locked. Similar to the fuses noted above, lockable on-chip, non-volatile memory programming is intended to be lockable (or unchangeable), advanced protection mechanisms such as the one described herein may be utilized to prevent against hardware security vulnerabilities affecting the programming lock mechanism.

In some aspects, additionally or alternatively to the fuses and/or lockable on-chip, non-volatile memory, another mechanism in which the public identity value of the security intelligent controller may be stored is one or more physically unclonable functions (PUFs). PUFs are physical objects embedded in the silicon of the security intelligent controller that provide a random, fixed in time output based on that specific silicon physical properties, such as doping. PUFs may be configured such that physical tampering with the silicon of the security intelligent controller (e.g. via focused ion beam (FIB)) disrupts the output of the PUFs such that the original output is lost or destroyed.

Each of the fuses, lockable on-chip, non-volatile memory programming, and/or PUFs may be considered a secure physical object of the security intelligent controller as used herein.

In addition to the public identity, the security intelligent controller may also implement a private (or hidden) identity value programmed by a manufacturer of the security intelligent controller as part of the manufacturing process. For instance, the private (or hidden) identity value may be programmed using field programmable fuses, lockable on-chip non-volatile memory, and/or other mechanism by the OEMs/ODMs/CSPs as part of their manufacturing process, or via PUFs of the security intelligent controller. This hidden identity value may be an example of an asymmetric key identity (e.g., private/public key pairs) which is stored in fuses, lockable on-chip non-volatile memory, PUFs, and/or other mechanism programmed by the security intelligent controller manufacturer as part of the manufacturing process, stored in field programmable fuses, lockable on-chip non-volatile memory, PUFs, and/or other mechanism programmed by the OEMs/ODMs/CSPs as part of their manufacturing process. In some instances, the private and/or public identities may be utilized as seed values for the security intelligent controller to generate the private/public key pair.

As noted above, a security intelligent controller can utilize fuse and/or on-chip non-volatile memory programming locking to provide increased security. For instance, in some cases, a security intelligent controller can include both programmed fuses (e.g., fuses that are used to embed a private key or other information or data) and unprogrammed or inert fuses (e.g., fuses that do not encode a particular value, but which can be activated by other fuses, such as programmed fuses, so as to encode a particular value in the unprogrammed fuses). In one illustrative example, the manufacturer of the security intelligent controller can purposefully leave certain fuses unprogrammed (which can be referred to as inert or unprogrammed fuses). For added security robustness to the fuse programming lock mechanism against potential hardware security vulnerabilities, fuses that are inert (e.g., not intended to be used by the security intelligent controller but that could be used by the security intelligent controller if activated via other fuses) will not be left in the un-programmed state. Rather, the manufacturer may, or the security intelligent controller may, be configured to program some or all unused fuses to the other polarity than the ones they were manufactured with. In some implementations, the manufacturer or the security intelligent controller may program, one or more of the unprogrammed fuses. In some implementations, the manufacturer or the security intelligent controller programs all unprogrammed fuses, so that the unprogrammed fuses are not left in an unprogrammed state (e.g., by programming the unprogrammed fuses to the opposite polarity than the polarity the fuses were manufactured with). One or more redundant fuse programming locking mechanisms can be implemented to increase the security of the security intelligent controller.

For instance, some fuses may be utilized by a computing device to store firmware or other software executed by the computing device. In another example, the fuses may be utilized to store flags or other settings that, when set, provide access to the computing device by other devices in communication with the computing device. As such, an attack on the computing device may occur through unauthorized access of the fuses of the computing device. For example, an attacker may burn one or more of the inert (or unprogrammed or unused) fuses (e.g., programming one or more of the fuses that were left unprogrammed by the manufacturer) to gain access and control of the computing device, such as through the installation of an undetectable rootkit program into the fuses. In order to prevent the consequences of such attacks that re-enable fuse programming in the field (e.g., after manufacturing, during the supply chain, or after deployment at the customer facility), a manufacturer of a computing device with fuses may program the inert (unprogrammed or unused) fuses with specific patterns. These patterns may prevent an attacker from inserting malicious configuration combinations or undetectable firmware rootkits in the fuses that would compromise the security of the product.

In one illustrative mitigation approach, the manufacturer of the computing device may burn all the inert or unused fuses (e.g., program the fuses to the opposite polarity they were manufactured with) allocated to firmware patching via fuses to prevent the undetectable firmware rootkits from being installed in the fuses after the silicon leaves the manufacturing facility. For example, a set of fuses of a processing device may control the location in a fuse array of a firmware patch. In general, processing device firmware patches are firmware programs or data that fix functional or security bugs or add new functionality. Processing device firmware patches can be loaded on a processing device from various media such as memory (for patching done by BIOS or operating systems) or fuses (programmed in manufacturing). In one example, the processing device firmware patch may be stored in fuses by the manufacturer (done during manufacturing/testing of the processing device). More particularly, the processing device firmware patch section may be statically allocated with a given number of fuse bits for storage of values or data associated with a firmware patch. This static allocation means that no other piece of functionality can claim the reserved bits for the firmware patch section. In some instances, however, only a subset of the firmware patch section fuses may be used in production, which means the rest of the statically allocated fuses for this section will likely be inert (unprogrammed, considered as a logic zero (0) and never used by the processing device). An attacker may use these inert fuses to launch an attack on the processing device by extending the processing device firmware patch through an attacker programming the inert fuses (as they are all unprogrammed in manufacturing and can be programmed by an attacker to encode whatever firmware instruction it is useful to them to make the attack possible).

In instances in which a set of fuses of a processing device may control the location in the fuse array of a firmware patch, an attacker may burn some of the fuses in the processing device set fuses to a value of one in such a way that the firmware patch is now located in another place of the fuse array that includes inert fuses that the attacker can then program to insert an undetectable rootkit in fuses. To mitigate against such an attack, the processing device manufacturer may determine a group of fuses of the computing device that is associated with firmware patching, identify the fuses of that group that are not used by the computing device, and burn the inert or unused fuses prior to shipping of the device. In another example, the manufacturer can select the set of fuses controlling the location in the fuse array of a firmware patch in such a way that an attacker cannot relocate the firmware patch (e.g., the firmware patch would either reside outside the fuse array or collide with other fuses used for different functionality). In still another example, the inert fuses belonging to the firmware patch in fuses section may be burned with a chosen bitstream such that, if an attacker burns any of the remaining unburned fuses to a value of one, the attacker cannot encode any firmware instructions that are useful in an attack.

By programming the fuses controlling the parameters of the firmware patching, the firmware patch cannot be moved or extended beyond the allocated space by placing the firmware patch between groups of fuse blocks that are used for different pieces of functionality (e.g., enabling/disabling of processing device features, silicon speedpath correction parameters, silicon redundancy control, etc.) and programmed with patterns that do not allow the attack to be carried out. As noted above, the fuse array may contain sections allocated to various pieces of functionality (such as a processing device firmware patch in fuses). The location of the firmware patch in the fuses can be controlled by another set of fuses. If the processing device manufacturer programs this set of fuses in such a way that the entire firmware patch is located between two sections allocated (and programmed) for other pieces of functionality, then the attacker cannot extend the firmware patch as there are no inert fuses allocated to the processing device firmware patch (e.g., the processing device firmware patch section is always of the size of the firmware patch programmed in the fuses during processing device manufacturing).

Although discussed above as being performed by the manufacturer, it should be appreciated that the fuse burning described herein can be achieved through or performed by the security intelligent controller or another on-die logic block during the silicon manufacturing and testing process.

In a similar manner, for added security robustness to the on-chip non-volatile memory programming locking mechanism against hardware security vulnerabilities, a security intelligent controller that includes an on-chip non-volatile memory can implement one or more redundant on-chip non-volatile memory programming lock mechanisms. For example, in some implementations, the security intelligent controller uses one or more redundant fuse programming lock mechanisms to implement the on-chip non-volatile memory programming mechanisms.

The public identity and/or the private identity of the security intelligent controller may be used to authenticate the security intelligent controller to local and/or remote computing devices. For example, the asymmetric key identity (e.g., private/public key pairs) may be generated by the security intelligent controller and used to identify the security intelligent controller to local or remote devices through an authentication process using the key pairs. The security intelligent controller public identity, along with its public key identity, may be published by the security intelligent controller manufacturer and used in exchanging of identities with the local or remote devices, as explained in greater detail below. The authentication process may occur, in some instances, during a secure booting procedure of the security intelligent controller to authenticate the identity of the security intelligent controller to the remote or local computing device communicating with the security intelligent controller. In one example, the security intelligent controller may implement a fixed secure boot procedure by executing an authentication procedure of an initial firmware/software program using a public key or hash of a public key embedded in a secure physical object, such as via the fuses or lockable on-chip non-volatile memory programmed by the security intelligent controller. In another example, the security intelligent controller may implement an open secure boot procedure by executing an authentication procedure of an initial firmware/software program using a received unauthenticated public key generated from a private/public key generation algorithm. The open secure boot procedure may be utilized to allow untrusted software to execute on the security intelligent controller for testing during the manufacturing phase of the controller. Once deployed in a computing device and available to outside software programs, the security intelligent controller may implement a dynamic secure boot procedure that initially boots the controller in the open secure mode (in manufacturing or testing by untrusted parties) and then in the fixed mode when a local or remote device intends to run firmware/software on the security intelligent controller. In one example, a default secure boot mechanism at cold reset (e.g., a reset of the security intelligent controller following an operational state in which no power is applied to the controller) for the security intelligent controller may be the open secure mode and a fixed secure boot procedure is used at a warm reset (e.g., a reset of the security intelligent controller following an operational state in which power was applied to the controller and certain information is preserved (not lost as part of the reset)). In one example, switching to the fixed secure boot procedure may be controlled via a software mechanism that instructs the security intelligent controller to use the fixed secure boot mechanism on the next warm reset.

The fixed, open, and/or dynamic secure boot processes or procedures may be executed by the security intelligent controller upon initial start-up of the controller and/or when the security intelligent controller is requested to execute a firmware/software program. For example, the security intelligent controller may be a processing device as described above that executes firmware/software programs for other computing devices or components. Such computing devices may be remote or local to the security intelligent controller. In one particular example, the security intelligent controller may be a component or portion of an open system available to third party or remote computing devices. One such open system may be a bare metal computing device or system available from a CSP. As used herein, a bare-metal computing devices is a computing device accessible in a cloud computing environment that hosts software for a single customer running directly on the hardware without being virtualized by the CSP. For the remote computing device to trust the bare-metal computing device, the security intelligent controller may execute a dynamic secure boot procedure that authenticates the controller's identity to the remote computing device (and vice versa) such that data transmitted between the devices may be trusted. In a similar manner, the security intelligent controller may be configured to execute a dynamic secure boot procedure for local computing devices accessing the controller. As used herein, a local computing device is a computing component in direct communication with the security intelligent controller in a closed system not available for public access (e.g., an FPGA in a closed system that also includes the security intelligent controller). A dynamic secure boot procedure for authentication of the security intelligent controller and/or remote and/or local computing device that utilizes asymmetric private/public key identities is described in greater detail below.

The security intelligent controller may also be configured to execute an open secure boot process or procedure for local computing devices. Such open secure boot procedures may include a private or hidden identity value of the security intelligent controller used to authenticate the controller with the local computing device. In one example, the open secure boot procedure may include a provisioning phase that may be executed at a trusted manufacturing facility to provision the security intelligent controller with the private identity value and a post-provisioned phase that is executed by the security intelligent controller once deployed in the closed system. An open secure boot procedure for authentication of the security intelligent controller and/or local computing device that utilizes a private identifier value is also described in greater detail below.

In addition to authentication procedures, the security intelligent controller may also encrypt data stored to one or more memory components to secure the data from unauthorized access. Encryption techniques utilized by the security intelligent controller may include integrity and anti-replay techniques. Data encryption may be used to aid in keeping the confidentiality of the data is maintained during the storage of the data in memory. In one example, encryption of the data may be obtained through a symmetric encryption key used by the security intelligent controller to encrypt the data (prior to storage in the memory) and decrypt the data (upon retrieval from the memory). In addition to encryption, the security intelligent controller may perform an integrity check on the encrypted data to aid in ensuring the encrypted data has not been tampered with during storage. In one example, the security intelligent controller may derive an integrity value associated with the encrypted data to be stored. The integrity data may be obtained through a secure hash algorithm or through any other algorithm to derive a value from the encrypted data. The integrity data may then be stored in a cache portion or other storage portion of the security intelligent controller as associated with the stored encrypted data. Upon retrieval from the memory component, the security intelligent controller may derive an integrity value of the retrieved data and compare the integrity value of the retrieved data to the integrity value stored in the security intelligent controller cache. If the values match, then the retrieved data may be considered valid based on the comparison to the stored integrity value. The security intelligent controller may also execute an anti-replay procedure on the encrypted data to ensure that a block of data retrieved from the memory component is the last block of data written to the memory location. To provide the anti-replay protection, the security intelligent controller may maintain one or more counters associated with lines of data stored to memory. Upon encryption of data for storage in memory, a version value associated with the memory location may be included with, and encrypted with, the data. The version value may also be stored in the counter associated with the memory location. Upon retrieval, the data may be decrypted and the security intelligent controller may compare the version value obtained from the stored data and the value of the associated counter. If the values match, then the retrieved data may be considered valid based on the comparison to the stored counter value. Through the encryption with integrity and anti-replay, the security intelligent controller may secure data stored in one or more memory components connected to or otherwise in communication with the security intelligent controller.

The security intelligent controller may also, in some examples, store the encrypted data with the integrity and anti-replay features in a memory component through a paging configuration. However, the paging configuration may consume a significant portion of the available space, particularly for paging configurations that utilize a relatively small page size (in comparison to the overall available memory space). To reduce the space utilized by the paging configuration, the security intelligent controller may compress entries in the page tables stored in the memory to increase the smallest page size of the paging configuration. To compress the amount of memory taken by the page table entries, the security intelligent controller may extend the small page size of the memory pages by having a single page table entry or extended page table entry map to an extended page size. In one example, the page table entries may be mapped to page sizes up to one half of the total size of the memory covered by a page directory entry or extended page directory entry. The extension of the smallest page size may be configurable by the security intelligent controller and may be utilized to increase the available memory space for a computer system associated with the security intelligent controller.

Through the processes and procedures executed by the security intelligent controller described herein, trusted and confidential computing of the controller and other components in communication with the controller may be achieved by a remote or local computing device. The security intelligent controller may authenticate itself and other components in communication with the controller, authenticate firmware/software programs to be executed by the security intelligent controller or other processing device, and/or encrypt data processed by the security intelligent controller or other processing device with integrity and anti-replay functionality. In some examples, the security intelligent controller may be deployed in a remote computing environment, such as a cloud computing environment, to provide the trusted and confidential computing in the remote computing environment. Through the security features described herein and executed by the security intelligent controller, users of computing systems, whether local to the computing system or remote, may trust the security intelligent controller to maintain security over the user's data and the operation of the computing system. These and other advantages over the present state of the art through the I/O device emulation technology will be apparent from the present disclosure.

Various aspects of the application will be described with respect to the figures. FIG. 1 is a schematic diagram illustrating an example of a cloud computing environment 100, in accordance with some examples. The environment 100 may include a cloud computing environment 102, which may be provided by a cloud service provider and which may include various interconnected network devices for transmission of data packets between the devices. The cloud computing environment 102 may include numerous components to provide various services to networks and devices connected or otherwise in communication with the cloud computing environment. For example, the cloud computing environment 102 may include one or more devices, components, systems, etc. to provide networking services 104, compute services 106, and/or storage services 108. One or more networks 112 and/or computing devices 110 may be in communication with the cloud computing environment 102 to receive or otherwise utilize the services provided by the cloud environment. Connected networks 112 and/or devices 110 may include any computing device, such as, but not limited to, a personal computer or mobile computing device, connected to cloud computing environment 102. The components of the connected networks 112 and devices 110 enable the devices or networks to communicate with the cloud computing environment 102 to receive services from the environment.

Figure 2:
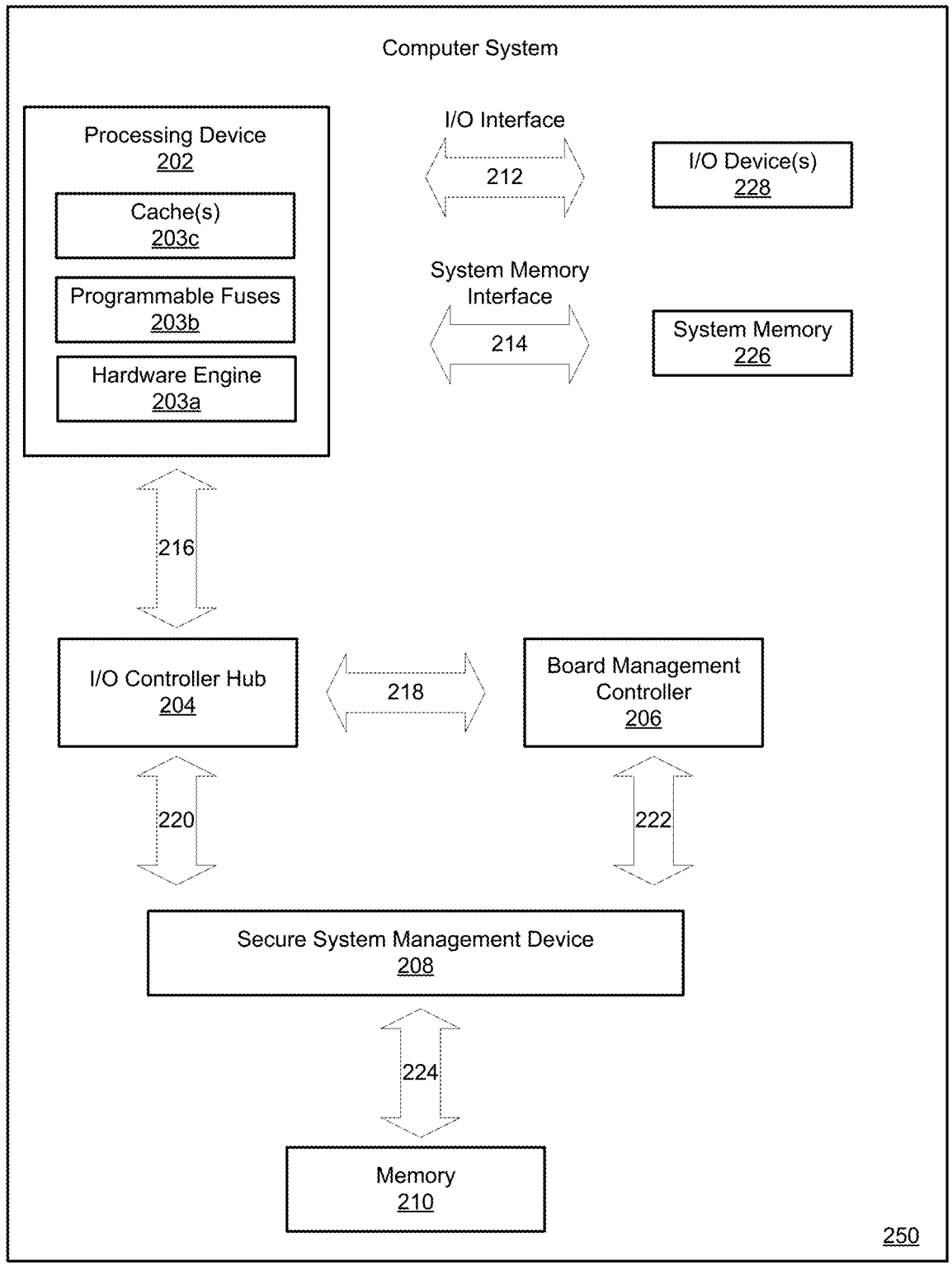
FIG. 2 is a schematic diagram illustrating an example of a computing system, in accordance with some examples.

FIG. 2 illustrates a computer system 250, which can be used to describe certain implementations of the subject matter described herein. In some instances, the computer system 250 may be a computing device of the cloud computing environment 102, such as an application server providing compute services 106, network services 104, and/or storage services 108 to the customer network 112 and/or remote computing device 110. In general, however, the computer system 250 may be any computing device or collection of devices configured to perform some computing process. The computer system 250 may include a processing device 202, an I/O controller hub 204, a board management controller 206, a secure system management device 208, a memory 210, a system memory 226, and I/O device(s) 228. Although illustrated in FIG. 2 with particular components, the computer system 250 may include additional or different components which are not shown in FIG. 2 for the ease of simplicity. In some examples, the computer system 250 may be used in cloud computing, edge computing, fog computing, mobile computing, or in other suitable applications.

The different components of the computer system 250 may communicate on a platform board using interfaces based on suitable bus protocol (e.g., peripheral component interconnect (PCI), PCI express (PCIe), low pin count (LPC), serial peripheral interface (SPI), system management bus (SMBus), universal serial bus (USB), SATA, among others). The memory 210 may be volatile (e.g., DRAM/refreshable and/or other volatile memory) or non-volatile (e.g., coherent Non-Volatile RAM/NVRAM or non-coherent storage/NAND on SSDs or HDDs, and/or other volatile memory). Note that in some instances, two or more components of the computer system 250 may be integrated. For example, the two or more components of the computer system 250 may be on the same die or their functionality may be integrated.

The computer system 250 includes processing device 202, which can also be referred to herein as a security intelligent controller 202. The processing device 202 can be a processing device that can provide capabilities to implement a secure boot process on the platform, as well as support memory and I/O traffic encryption with integrity and anti-replay. The processing device 202 may include one or more processor cores based on Intel®, AMD®, ARM®, or other suitable architectures. The processing device 202 may also execute a hardware engine 203a to perform one or more of the security features discussed herein, such as traffic encryption with integrity and anti-replay for interfaces with the system memory 226 and the I/O devices 228.

In some examples, the processing device 202 may also include programmable fuses 203b, which may be static or dynamic fuses. Static fuses are those that can only be programmed once and, once programmed, retain their programmed value. Dynamic fuses are fuses that can be programmed multiple times and, once programmed, retain their programmed value until they are reprogrammed. Programming, or burning, a fuse refers to the process of applying an electrical signal to the fuse to embed a readable value into the fuse. The readable value can be a one-bit binary value, and reading the value of a fuse refers to determining its readable value. Multiple fuses can be read to determine a multi-bit value.

The processing device 202 may also include one or more caches 203c. The cache(s) 203c may include one or more levels of caches for which the processing device 202 may store data and may be arranged in levels of cache. For example, the cache 203c may include a last level cache (LLC). As explained in more detail below, the processing device 202 may utilize the caches 203c to store security-related data, such as counters for anti-replay features of encrypted data.

The processing device 202 may utilize various interfaces to communicate with peripherals, memory devices, I/O devices, controllers, etc. For example, an I/O interface 212 may be used to communicate with various I/O devices 128 (e.g., accelerators for graphics, artificial intelligence (AI), etc.). The I/O interface 212 may be based on a peripheral component interconnect express (PCIe) interface or another suitable interface based on the I/O device. A system memory interface 214 may be used to communicate with the system memory 226 (e.g., DRAM, SDRAM, DDR SDRAM). For example, in certain implementations, the system memory interface 214 may include data direction register (DDRx) channels to communicate with double data rate (DDR) memories.

The I/O controller hub 204 may include a centralized I/O controller to communicate with various peripherals and other components on the platform to provide other support functions for the processing device 202. In some examples, the I/O controller hub 204 may be implemented as a platform controller hub (e.g., Intel® PCH) comprising a management engine (e.g., Intel® management engine). In other examples, some or all of the functionality of the I/O controller hub 204 may be integrated with the processing device 202. The I/O controller hub 204 and the processing device 202 may communicate with each other using a bus interface 216. The bus interface 216 may be based on a PCIe interface or a proprietary interface. In some examples, the bus interface 216 may include a direct media interface (e.g., Intel® DMI) to communicate with the I/O controller hub 204 configured as the PCH. In some implementations, the I/O controller hub 204 is omitted (e.g., such that the board management controller 206 and the secure system management device 208 communicate directly with the processing device 202).

The board management controller 206 and the I/O controller hub 204 may communicate using an interface 218. The interface 218 may be based on an LPC interface, enhanced SPI bus, or another suitable interface. The board management controller 206 may be used to monitor physical state of the board using various sensors (e.g., voltage, humidity, temperature, etc.). The board management controller 206 may also include network connectivity and can be used to manage the platform through resets, firmware updates, etc. The board management controller 206 may include a processor and memory. In some examples, the board management controller 206 may boot from firmware stored in a dedicated non-volatile memory (e.g., a SPI flash), which may be internal or external to the board management controller 206. In some examples, as noted above, the processing device may boot through the I/O controller hub 204.

The secure system management device 208 may be used to sequence the power for the system 200 and the processing device 102 using secure methods according to certain implementations. The secure system management device 208 may be implemented as a field programmable gate array (FPGA) or another suitable circuit. In certain examples, the secure system management device 208 may include a processor (not shown) configured to execute instructions stored in memory. The memory may include a memory 210, which may be internal or external to the secure system management device 208. The secure system management device 208 may be configured to communicate with the I/O controller hub 204 via an interface 220, and with the board management controller 206 via an interface 222. The interfaces 220 and 222 may include a serial management bus (SMBus), SPI links or other suitable interfaces. In certain implementations, some of the features or functionalities of the processing device 202 may also be executed on the secure system management device 208. The secure system management device 208 may also be configured to communicate with a server for testing purposes or for running various applications.

The secure system management device 208 may also communicate with a memory 210 via an interface 224. In some examples, the memory 210 may be used to store platform firmware for the computer system 200. For example, in certain implementations, the memory 210 may store BIOS and/or firmware patches for the processing device 202. The secure system management device 208 may be communicatively coupled (e.g., over one or more bus interfaces) to the I/O controller hub 204, the board management controller 206 SPI links, and the memory 210. The memory 210 can store the active platform firmware, such as recovery and recovery candidate copies of the firmware or other software. The secure system management device 208 may also be communicatively coupled to the I/O controller hub 204 and the board management controller 206 using one or more SMBus links.

Through the methods and processes described herein, any data entering and exiting the processing device 202 from various I/O devices, peripherals, memory devices, etc., in the computer system 250 may be secured and encrypted. In accordance with certain implementations, communication with the processing device 202 over the various bus interfaces (e.g., the PCIe, memory interfaces, or DMI) can be secured through the methods and processes described herein to minimize the vulnerability to attacks. Implementations of the disclosed techniques can provide secure capabilities to harden the system 250 against both software and hardware/physical attacks.

In some instances, the processing device 202 of the computer system 250 may be configured as the security intelligent controller discussed herein. More particularly, the processing device 202 may execute firmware/software and/or include hardware components configured to perform the security methods and processes, such as component authentication, data encryption with integrity and anti-replay, and the like. Alternatively or in addition, other components of the computer system 250 may also be configured as the security intelligent controller for the computer system. For example, the board management controller 206 and/or the secure system management device 208 may also perform the security methods and processes discussed herein. In general, any component of the computer system 250 with data processing capabilities may be the security intelligent controller for the computer system. One or more of the other components may be secondary security intelligent components controlled by the security intelligent controller to perform one or more of the security operations or methods discussed. Data transmitted to security unenlightened components (e.g., system memory 226 and/or I/O devices 228) may be encrypted with integrity and anti-replay features by the security intelligent controller and/or the secondary security intelligent components to maintain the security of the data transmitted away from the security intelligent components of the computer system 250. For ease of understanding, however, the processing device 202 is referred to herein as the security intelligent controller for the computer system 250.

A component, such as a memory 210, may be referred to as "on-chip" relative to another component, such as a security intelligent controller, if the components were manufactured on the same substrate and occupy space on the same integrated circuit chip (or die). Including an on-chip component on the same chip as the security intelligent controller can be more secure than having components that occupy different chips. For example, an on-chip non-volatile memory can be more secure than a non-volatile memory that is not on the same chip as the security intelligent controller. Components that are manufactured together on-chip may be encapsulated by a protection layer and/or a heat-dissipation layer that can afford additional security to the components. For example, a malicious entity interested in removing, replacing, and/or electrically probing (e.g., using a focused ion beam (FIB)) an on-chip non-volatile memory may not know the location of the memory because the encapsulation obscures the footprint of the component on the chip. If the malicious entity does know the location of the component it is interested in exposing or misappropriating, removing the encapsulation may result in the component, or other on-chip components, being exposed to contaminants or breaking down because of the lack of heat dissipation. The chip can shut down or otherwise become unusable due to such tampering of the chip.

On the other hand, a malicious entity interested in replacing a non-volatile memory that is not on-chip (e.g., a non-volatile memory that is on a separate chip than one that includes a security intelligent controller) may be able to do so by replacing the separate chip and intercepting data that was intended to be received by that separate chip. When the component is not on-chip, the malicious entity may be able to expose the component (e.g., by drilling into the chip of the component) with less of a risk of damaging components on the other chip, such as the security intelligent controller. In addition, the malicious entity may be able to expose and provide heat dissipation to the components on the separate chip without having to worry about overheating or contaminating the components on the other chip. Thus, data and components manufactured on-chip (e.g., the components of processing device 202) may be considered secured and trusted, while those components not on-chip may be particularly vulnerable to attacks. Data transmitted from a trusted component to a non-trusted component may therefore be authenticated and encrypted through one or more of the processes described herein to ensure security of the data.

Figure 3:
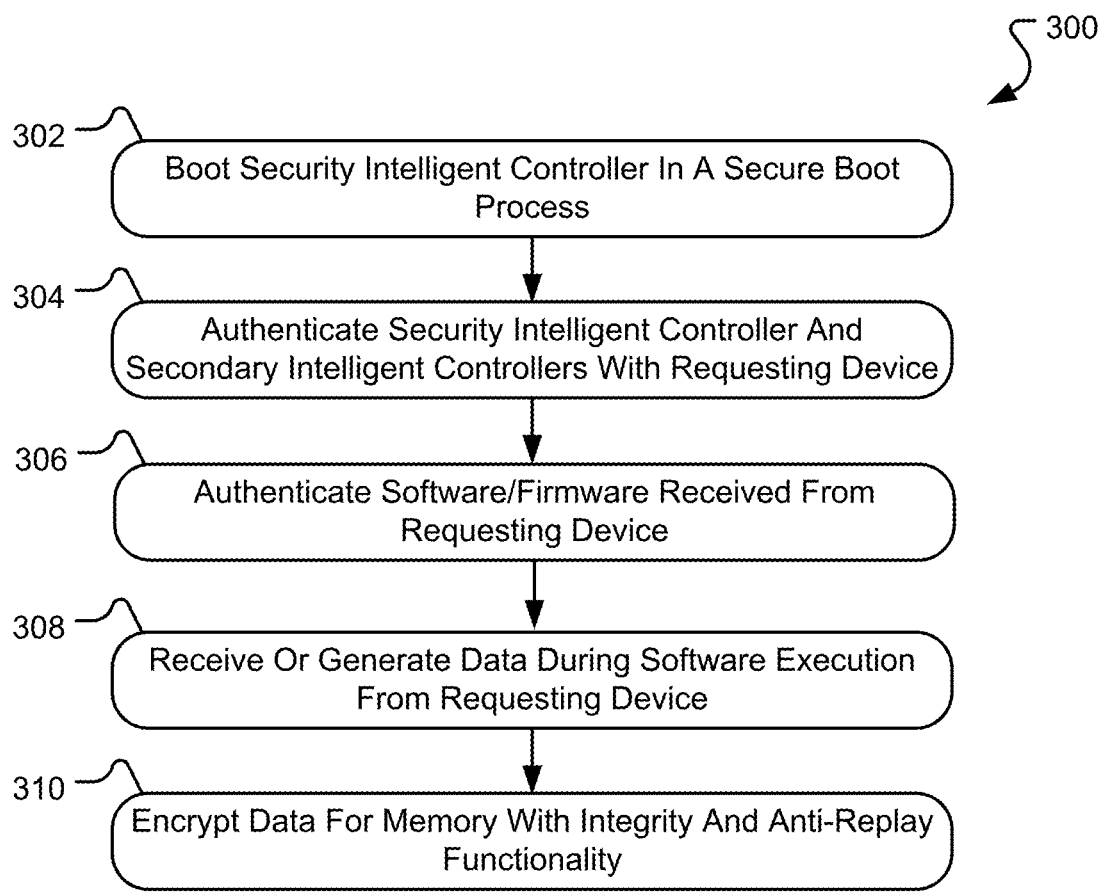
FIG. 3 is a flowchart illustrating an example of a method (or process) for securing a computing environment using a security intelligent controller, in accordance with some examples.

FIG. 3 is a flowchart illustrating an example of a method (or process) 300 for securing a computing environment using a security intelligent controller, in accordance with some examples. The method 300 may be performed by the processing device 202 (also referred to as the security intelligent controller) of the computer system 250 of FIG. 2. The operations of the method 300 may be performed by the security intelligent controller 202 through execution of some type of program (software and/or firmware), one or more hardware components of the processing device, or through a combination of both hardware and programmed components. Through the operations, the security intelligent controller 202 may become a trusted computing base for use by remote or local computing devices to execute software safely and confidentially. The method 300 of FIG. 3 is provided as an overview of the various security processes and procedures the security intelligent controller may perform to ensure a trusted compute base for the computer system 250. Specific examples of the operations of the method 300 are provided in more detail below.

At operation 302, the security intelligent controller may execute a secure boot process, such as an open secure boot process, a fixed secure boot process, or a dynamic secure boot process that includes aspects of the open secure boot and fixed secure boot process. During the secure boot process executed by the security intelligent controller, one or more public identifier values, one or more private identifier values, or a combination of public and private identifier values of the security intelligent controller may be utilized to authenticate the identity of the controller and/or a computing device (whether remote or local) requesting access to the computer system 250 at operation 304. In some examples, such values may be stored in secure physical objects of the security intelligent controller 202, such as PUFs, fuses, lockable on-chip non-volatile memory, and the like. The values may, in some examples, be used as encryption keys, decryption keys, authentication keys, and/or be used as seeds for generating one or more keys. Such keys, or additionally generated authentication and/or encryption keys, may be utilized to authenticate a software and/or firmware provided by the requesting device at operation 306. For example, a computing device may request the computer system 205 that includes the security intelligent controller 202 to execute software and/or firmware on behalf of the computing device. The computing device may therefore provide the firmware/software to the security intelligent controller 202, perhaps in an encrypted and/or hashed block of data, as explained more below. The security intelligent controller 202 may utilize one or more authentication keys, either stored with the controller or generated from a public and/or private identity value to authenticate the firmware/software as originating from a trusted source before executing the received firmware/software.

Upon executing the authenticated firmware/software from the requesting device, the security intelligent controller 202 may receive data (such as from a memory device) and/or generate data (such as through an operation of the executed program) at operation 308. However, one or more of the memory components of the computer system 250, such as memory 210, may be not on the same chip as the security intelligent controller. To ensure security of the data utilized by the executed program, the security intelligent controller 202 may encrypt the data with integrity and anti-replay functionality at operation 310. Through the encryption of the data with integrity and anti-replay, the data stored in the memory component (e.g., memory 210) of the computer system 150 may be trusted and/or authenticated such that hijacking or other attacks on the computer system is mitigated. Methods and processes for encrypting data with integrity and/or anti-replay features are also described in more detail below.

Figure 4A:
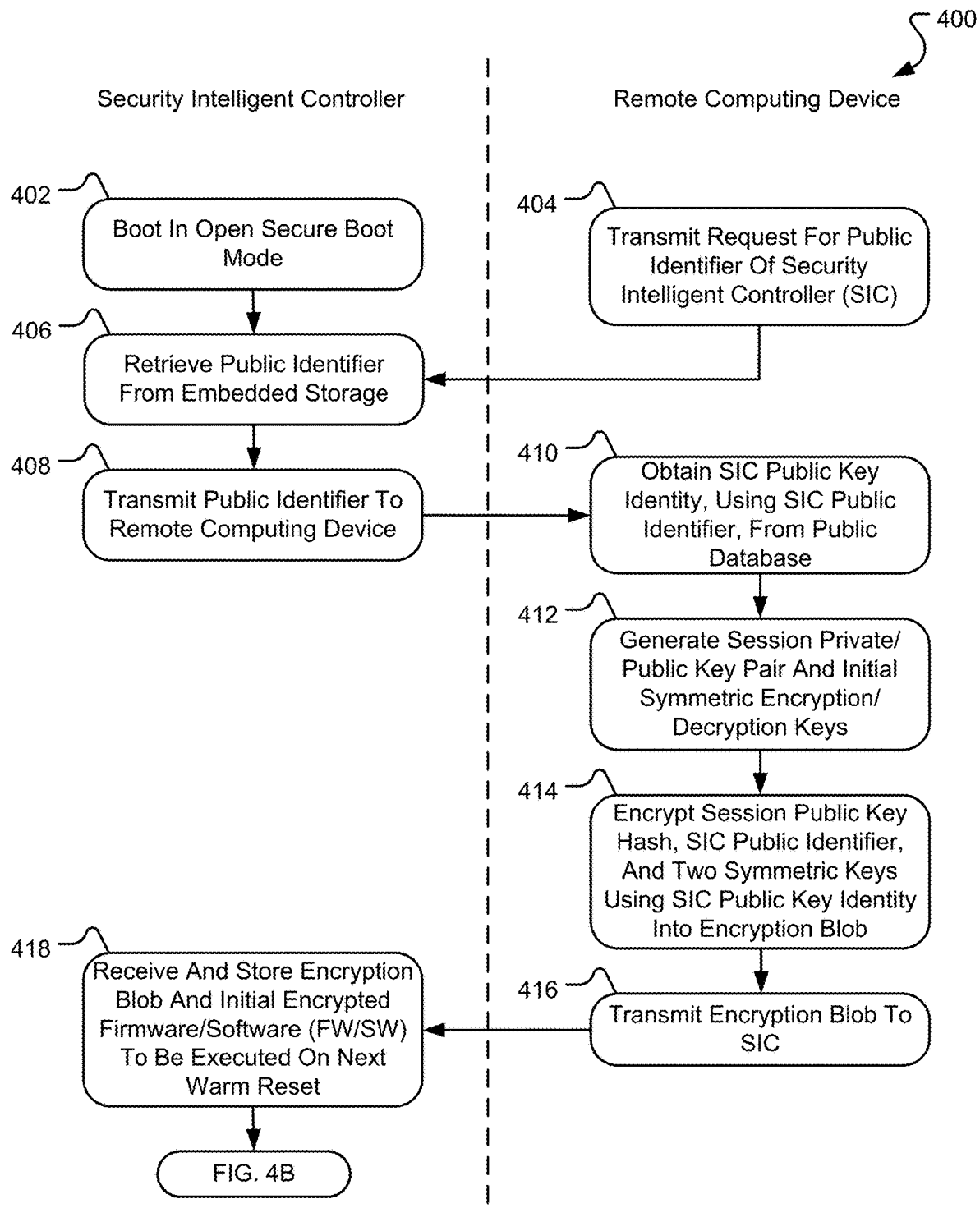
FIGS. 4A-4C is a flowchart illustrating an example of a method (or process) for executing a secure boot of a processing device, in accordance with some examples.
Figure 4B:
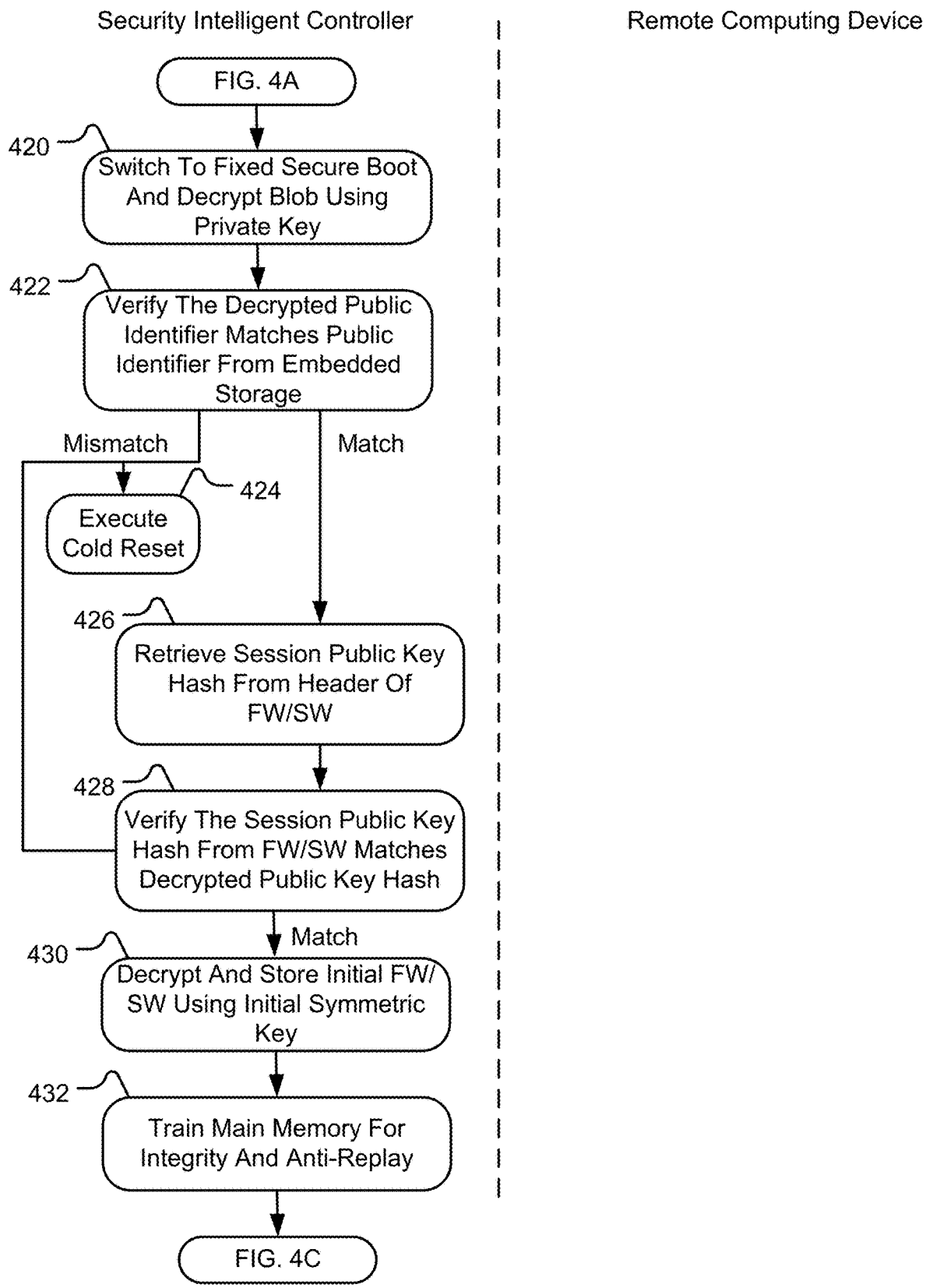
Figure 4C:
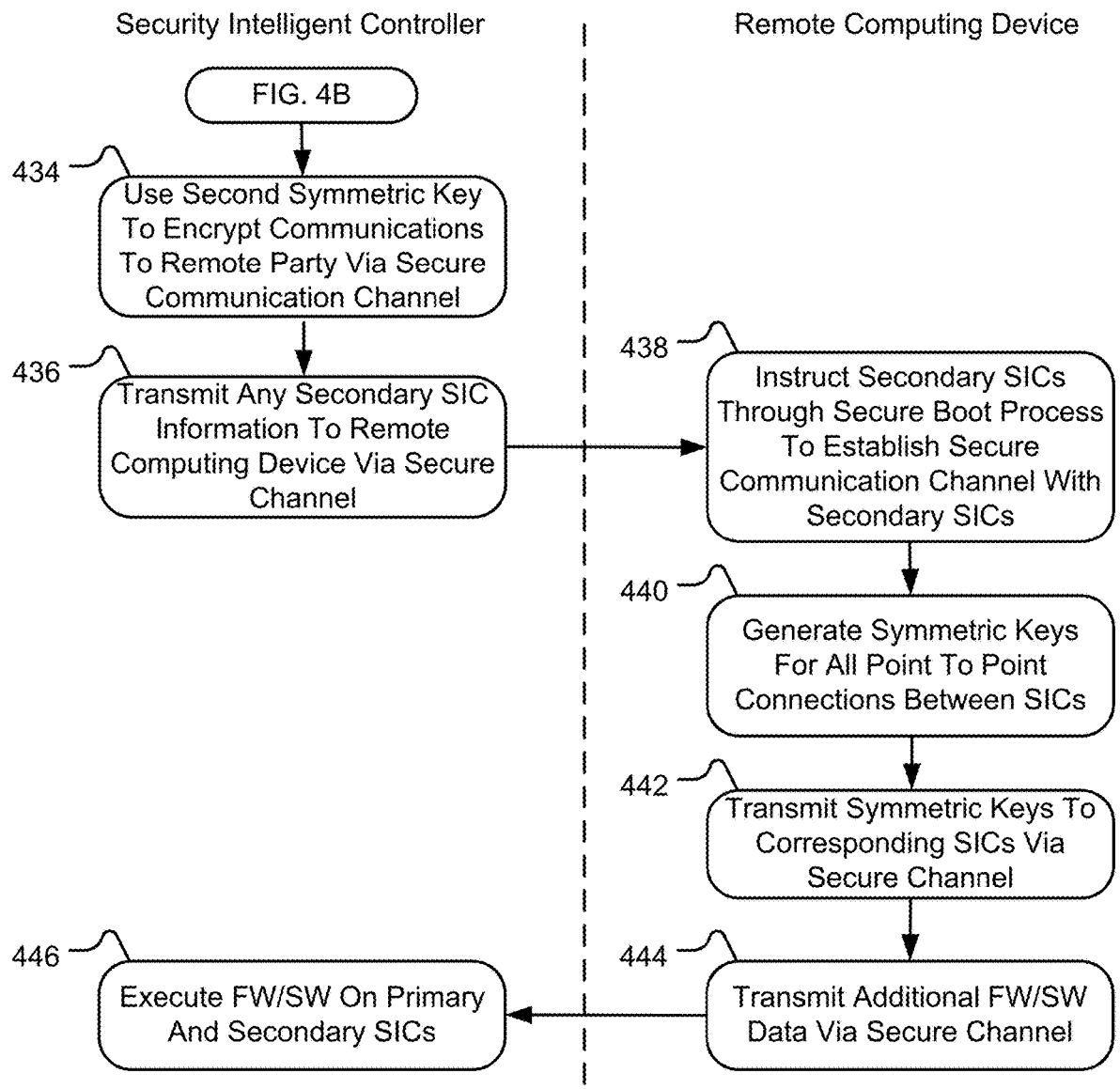

As mentioned above, a remote computing device 110 may access an open computing system, such as a compute server 106 of a cloud computing environment 102, to execute one or more firmware/software programs on the open computing system. For such configurations, the remote computing device 110 may trust a security intelligent controller 202 of the open computing system to provide confidential computing to the execution of the firmware/software. Other entities associated with the open system (e.g., the CSP, ODM, network infrastructure, supply chain etc.) may not be trusted in such a configuration as they provide various points of vulnerabilities to the security of the open computing system. In this configuration, the security intelligent controller 202 may be configured to execute a dynamic boot procedure to authenticate one or more components of the open system and/or the firmware/software of the remote computing device 110 to provide the secure computing. FIGS. 4A-4C is a flowchart illustrating an example of a method (or process) for executing a secure boot of a processing device, in accordance with some examples. The method 400 may include operations executed or performed by both the security intelligent controller 202 and/or the remote computing device 110 requesting the security intelligent controller (or the computer system 250 of which the security intelligent controller is a portion) to execute a firmware/software program. The operations may be performed through execution of one or more programs, one or more hardware components, or a combination of both programs and hardware components of the security intelligent controller 202, the remote computing device 110, or any other computing device or component of the open computing system.

Referring to FIG. 4A, at operation 402, the security intelligent controller 202 may be configured to execute a dynamic secure boot process that includes first booting the controller in an open secure boot mode. As mentioned above, the open secure boot mode may be enabled using secure physical objects of the security intelligent controller 202, such as fuses or lockable on-chip non-volatile memory programmed by the security intelligent controller manufacturer as part of the manufacturing process or via field programmable fuses or lockable on-chip non-volatile memory programmed by the OEMs/ODMs/CSPs as part of their manufacturing process. In particular, the remote computing device 110 may, at operation 404, transmit a request to the security intelligent controller 202 for a public identifier or of the security intelligent controller stored in one or more of the secure physical objects of the controller. At operation 406, the security intelligent controller 202 may retrieve the public identifier from one or more of the secure physical objects of the controller and, at operation 408, transmit the retrieved public identifier to the requesting remote computing device 110.

In some instances, the remote computing device 110 may utilize multiple components of the computer system 250 to execute a firmware/software. For example, the remote computing device 110 may utilize one or more I/O devices 228, FPGA devices, PCIe accelerators, etc. to execute a provided firmware/software. One or more these additional components may be configured as a security intelligent controller for the computer system 250 or as a secondary security component of the computer system. Regardless of the functionality subscribed to these components, one or more of the additional components may include a public identifier stored in one or more secure physical objects embedded on a respective component. In such a circumstance, the request for the public identifier for the public identity of the security intelligent controller 202 may also include a request for the public identity of other components of the computer system 250 which may be utilized by the firmware/software intended to be executed by the computer system. The additional public identities for the additional components of the computer system 250 may also be transmitted at operation 408 to the remote computing device 110.

At operation 410, the remote computing device 110 may access a public database and, with the public identity of the security intelligent controller 202, may obtain a public key identity from the public database. For example, a manufacturer of the security intelligent controller 202 may publish, such as through a website or other publicly available access, a database of public key identities corresponding to devices the manufacturer produces. The public database may be organized based on the public identity assigned to the devices of the manufacturer and stored in the secure physical objects of the devices by the manufacturer. Thus, in one example, the remote computing device 110 may, at operation 410, access the public database and, using the public identity of the security intelligent controller 202 as an index value, determine a public key identity associated with the security intelligent controller. The remote computing device 110 may obtain public key identities for the other components of the computer system 250 to be used by the executed firmware/software in a similar manner.

At operation 412, the remote computing device 110 may generate a session private/public key pair and one or two initial symmetric encryption/decryption keys using any known or hereafter developed technique for generating secure key pairs. In one example, the remote computing device 110 may execute a Rivest-Shamir-Adleman (RSA) key-generation algorithm in which a public key is used for encryption of data and a private key is used for decryption of the data. The RSA generated public/private key pair is based on two large prime numbers which, in some examples, may be provided by a digital random number generator (DRNG) of the remote computing device 110. In another example, the remote computing device 110 may execute an elliptic curve digital signature key generation algorithm (ECDSA) to generate the session private/public key pair. Although these two examples are provided, it should be appreciated that the remote computing device 110 may utilize any asymmetric key generation algorithm to generate the session private/public key pair. The remote computing device 110 may also generate two symmetric encryption/decryption keys through the appropriate algorithms such as using a DRNG. As explained in more detail below, the session private/public key pair may be utilized to authenticate a firmware/software provided by the remote computing device 110 and the two initial symmetric encryption/decryption keys may be used to encrypt and decrypt data and/or communications associated with the communication session of the remote computing device and the security intelligent controller.

At operation 414, the remote computing device 110 may hash the generated session public key utilizing a secure hashing function or algorithm. In general, a secure hashing function or algorithm is a repeatable derivation of an input value that may reduce the size of the input value. For example, the remote computing device 110 may utilize a Merkle-Damgard (MD5) algorithm to generate a 128-bit hash value of the session public key, a secure hash algorithm (SHA) to generate a hash value of the session public key, or any other known or hereafter developed secure hashing algorithm. Upon generating the hash of the session public key, the remote computing device 110 encrypts the hash of the session public key, the public identity value received from the security intelligent controller, and the two randomly generated initial symmetric encryption/decryption key utilizing the primary security intelligent controller's public key to generate an encrypted blob of data. In general, the remote computing device 110 may utilize any known or hereafter developed encryption algorithm that uses the security intelligent controller public key identity as an input for the encryption algorithm. As mentioned above, the security intelligent controller 202 public key identity is obtained from the public database and may be used to encrypt the encrypted blob of data. At operation 416, the remote computing device 110 may transmit the encrypted blob of data to the security intelligent controller 202, such as over a network connection between the remote computing device and the security intelligent controller.

At operation 418, the security intelligent controller 202 may receive and store, in a memory component of the computer system 250, the encrypted blob of data. In addition, the remote computing device 110 may also transmit the firmware/software that the remote computing device intends to be executed by the security intelligent controller 202 or other processing device of the computer system 250 on the next reset of the computer system. In some examples, the firmware/software may include a microcode or firmware patch and the BIOS firmware/software associated with the security intelligent controller. The transmitted firmware/software may include a digital signature value used for authentication of the firmware/software, as described in more detail below. In one example, the digital signature value may be inserted or otherwise included in a header portion of the firmware/software. The security intelligent controller 202 may store the firmware/software in one or more memory components of the computer system 250. In another example, the firmware/software to be executed by the computer system 150 on behalf of the remote computing device 110 may be previously stored in a memory component of the computer system or may be available from another device or component that is not the remote computing device. Regardless of the source, the firmware/software to be executed by the computer system 250 may be encrypted with a first of the two initial symmetric encryption keys generated by the remote computing device 110 as described above.

Referring to FIG. 4B, at operation 420, the security intelligent controller 202 switches to a fixed secure boot procedure and performs a warm reset (e.g., a reset of the security intelligent controller following an operational state in which power was applied to the controller and certain information is preserved (not lost as part of the reset)). In the fixed secure boot state, the security intelligent controller 202 retrieves a private key value stored in one or more of the secure physical objects of the security intelligent controller. The private key value corresponds to the public key identity obtained from the public database. For example, the manufacturer of the security intelligent controller 202 may generate a public/private key identity pair through one or more key-generating algorithms, store the private key in one or more of the secure physical objects of the security intelligent controller 202, and publish the public key in the publicly available database. As the encrypted blob of data mentioned above is encrypted using the public key obtained from the public database, the encrypted blob may be decrypted using the stored private key identity value of the security intelligent controller 202. Further, because the security intelligent controller 202 is the only device that has the private key identity value, the controller is the only device that can decrypt the encrypted blob of data.

At operation 422, the security intelligent controller 202 may verify that the public identifier value from the decrypted blob of data matches the controller's public identifier value. In one example, the public identifier is obtained from the one or more secure physical objects embedded in the security intelligent controller 202. If the public identifier values do not match, the security intelligent controller 202 cannot authenticate the identity of the remote computing device 110 and/or the security intelligent controller as the verified receiver of the encrypted blob of data. If the encrypted blob of data is not authenticated through the mismatch of the public identifier values, the security intelligent controller 202 may perform a cold reset of the controller at operation 424 to shut down and restart its operation without executing the firmware/software.

If the public identifier value from the decrypted blob of data matches the security intelligent controller public identifier value obtained from the secure physical objects of the controller, the controller may, at operation 426, retrieve a software verification value from a header of the firmware/software. In one example, the software verification value from the header of the firmware/software may be a hash of the session public key. In particular, the hash of the session public key may be inserted or included in the header of the firmware/software package by the remote computing device 110 as part of the signing of the firmware/software, as described above. At operation 428, the security intelligent controller 202 may authenticate the firmware/software by verifying that the software verification value (e.g., the hash of the session public key) obtained from firmware/software matches the hash value of the session public key obtained from the decrypted blob of data. If the hash of the session public key do not match, the security intelligent controller 202 cannot authenticate the firmware/software as received from the remote computing device 110 and the security intelligent controller may perform a cold reset of the controller at operation 424 to shut down and restart its operation without executing the firmware/software.

If the hash of the session public key obtained from the firmware/software package matches the hash of the session public key decrypted from the blob of data, the security intelligent controller 202 may, at operation 430, decrypt the firmware/software using the first of the initial symmetric encryption/decryption keys included in and decrypted from the blob of data received from the remote computing device 110. Upon decryption, the authenticated firmware/software may be stored in one or more of the memory components of the computer system 250, including in an on-chip memory component of the security intelligent controller 202 (such as on-chip cache(s)) to maintain the security of the authenticated firmware/software package. The security intelligent controller 202 may also begin execution of the firmware/software. In one example, the firmware/software package includes all firmware/software used by the security intelligent controller 202 from the warm reset, including firmware patches, BIOS, etc.

Referring to FIG. 4C, at operation 432, the security intelligent controller 202 may train the main memory (e.g., memory 210) and enable the integrity and anti-replay features of storing data. The integrity and anti-replay features of data storage in the memory 210 are described in more detail below. At operation 434 (illustrated in FIG. 4C) and during execution of the firmware/software, the security intelligent controller 202 may utilize the second symmetric encryption/decryption keys to encrypt communications intended for the remote computing device 110, establishing a secure communications channel between the devices. The encryption of the communications between the security intelligent controller 202 and the remote computing device 110 may also include integrity and anti-replay features. In one example described in more detail below, the encryption of the communications may use an advanced encryption standard (AES) with a corresponding AES-Galois/Counter mode (AES-GCM) counter value and tag (for integrity). The security intelligent controller 202 may also, at operation 436, transmit any secondary security intelligent component information to the remote computing device 110 via the secure communications channel. For example, the secure system management device 208 (or other components of the computer system 250) may be configured as a secondary security intelligent component of the system. Information associated with such secondary security intelligent components, such as public identifiers or other identifying information, may be transmitted to the remote computing device 110.

The remote computing device may send, via the secure communication channel to the security intelligent controller 202, information that the firmware/software running on the security intelligent controller 202 may transmit to one or more of the secondary security intelligent components connected to it via any interface (e.g. PCIe, DMI, SMBUS, network, etc.). In particular, the remote computing device 110 and the secondary security intelligent components may go through one or more of the same dynamic secure boot process described above to establish independent secure communication channels with all the security controllers on the computer system 250. For example, the remote computing device 110 may instruct, through the communication channel, the secondary security components to enter a secure boot process at operation 438. The remote computing device 110 may also generate one or more symmetric encryption/decryption keys for all of the point to point connections between the security intelligent controller 202 and any secondary security intelligent component at operation 440. The symmetric encryption/decryption keys may be generated by the remote computing device 110 utilizing the same or similar key generation algorithm as used above. At operation 442, the remote computing device 110 may transmit the generated symmetric keys for the point-to-point connections to the security intelligent controller 202 via the secure communication channel established above. The secondary security intelligent components may establish secure communication channels with the security intelligent controller 202 using the additionally generated symmetric keys in a similar manner as described above and via the one or more interfaces of the computer system 250. The secondary security intelligent components may now communicate over the secure interfaces that links them with all the traffic encrypted with integrity and anti-replay.

The remote computing device 110 may also, in operation 444, transmit, over the primary secure communication channel, additional firmware/software data firmware/software that any security intelligent controller or secondary controller may execute. In operation 446, the security intelligent controller 202 and any secondary security intelligent components may execute the firmware/software as requested by the remote computing device 110. Further, through the operations described above for method 400, the computer system 250 may be trusted by the remote computing device 110. To improve the security of the executed firmware/software, the symmetric encryption/decryption keys may be refreshed after a given number of encryption/decryption cycles and any data produced by a security intelligent controller 202 that is to be sent to the remote computing device 110 may be transmitted through the secure communication channel (encrypted with integrity and anti-replay).

The dynamic secure boot method 400 of FIGS. 4A-4C provide a secure computing experience for remote computing devices 110 accessing the computer system 250 through a network connection. However, the dynamic secure boot method 400 may also be performed for local computing devices that are part of a closed system and in which the local computing device communicates with the security intelligent controller 202 via a direct interface and not over a network connection.

As discussed above, the security intelligent controller 202 may encrypt data used for and generated by firmware/software executed by the controller. In particular, data that is sent "off-chip" of the security intelligent controller 202 to one or more memory devices of a computer system 250 may be encrypted to ensure that the data may not be intercepted and utilized to attack the computer system and/or programs executed by the computer system. Using the computer system 250 of FIG. 2 as an example system, the processing device 202 may be the security intelligent controller for the system and may execute firmware/software. Data associated with the firmware/software may be stored in memory 210. However, because the data is transmitted off the processing device 202 to the memory 210, the data may be vulnerable to interception and modification by a malicious party. To protect the data used by the security intelligent controller 202, the data may be encrypted and may, in some examples, include an integrity and anti-replay feature.

The security intelligent controller 202 may encrypt the data intended for storage in the memory 210 to provide a level of confidentiality to the data. In one example, the security intelligent controller 202 may utilize an AES encryption algorithm that may encrypt a block of data (e.g., 128 bits) using a symmetric key for both encryption and decryption. In some examples, the symmetric encryption key may be a random number generated by a random number generator. The symmetric key may be any size, including 128 bits, 192 bits, 256 bits, and the like. Encryption of the data may include a series of transformation rounds that convert the input data string, referred to the plaintext, to a final encrypted output, called the ciphertext. The ciphertext may only be converted back to the plaintext utilizing the symmetric key such that, as long as the symmetric key remains secret, the plaintext may maintain confidentiality. In one example, the ciphertext may be stored in the memory 210. However, in other examples, additional security protections of the data may be performed by the security intelligent controller on the data, such as integrity checks and/or anti-replay functions.

In general, an integrity check on encrypted data may aid a system in ensuring the encrypted data has not been tampered with during storage. In one example and in addition to encrypting the data, the security intelligent controller may derive an integrity value associated with the encrypted data. The integrity data may be obtained through a secure hash algorithm or through any other algorithm to derive a value from the encrypted data. The integrity data may then be stored on-chip with the security intelligent controller to ensure that the integrity data cannot be corrupted. In one example, the integrity data may be stored in a cache portion or other storage portion of the security intelligent controller. Upon retrieval from the memory component, the security intelligent controller may derive an integrity value of the retrieved data and compare the integrity value of the retrieved data to the integrity value stored in the security intelligent controller memory. If the values match, then the retrieved data may be considered valid based on the comparison to the stored integrity value.

An anti-replay feature of the encrypted data may aid the security intelligent controller 202 to check that a block of data retrieved from the memory location is the last block of data written to that memory location. To provide the anti-replay protection, the security intelligent controller 202 may maintain one or more counters associated with lines of data stored to memory. Upon encryption of data for storage in memory, a version value associated with the memory location may be encrypted with the data. The version value may also be stored in the counter associated with the memory location. Upon retrieval, the data may be decrypted and the security intelligent controller 202 may compare the version value obtained from the decrypted stored data and the value in the associated counter. If the values match, then the retrieved data may be considered valid based on the comparison to the stored counter value.

Figure 5:
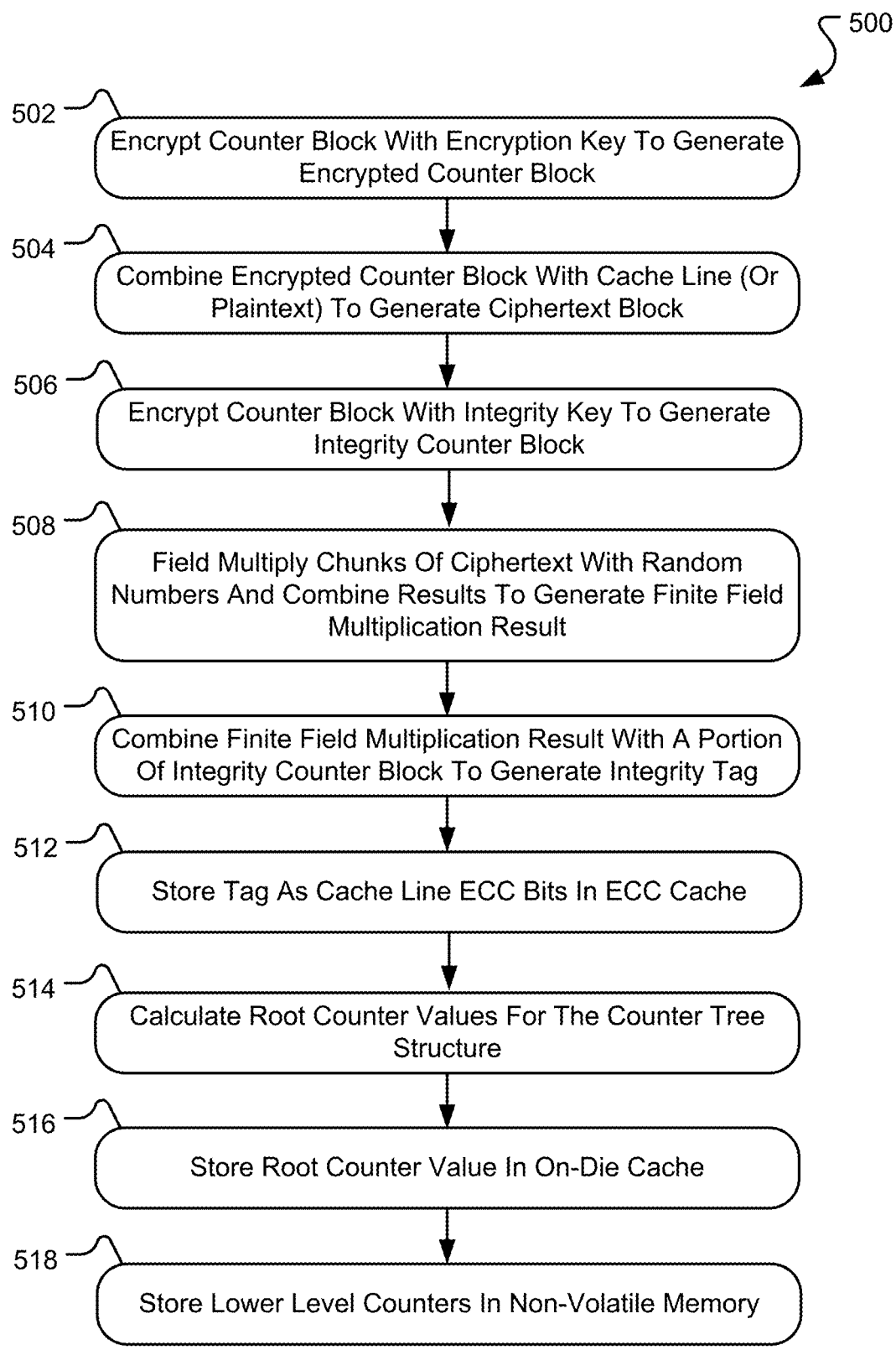
FIG. 5 is a flowchart illustrating an example of a method (or process) for encrypting data of a computing system with integrity and anti-replay, in accordance with some examples.

One example for providing integrity and anti-replay checks on stored data is provided with reference to the method 500 of FIG. 5. In the method 500, the security intelligent controller 202 may encrypt the data with integrity and anti-replay through an AES algorithm in counter mode, such as through an AES-GCM algorithm. Other encryption algorithms with counters may also be utilized by the security intelligent controller 202 such that the method 500 of FIG. 5 is but one example for providing the integrity and anti-replay functionality for data security. The operations of the method 500 may be executed by the security intelligent controller 202 through executing of a firmware/software program, through one or more configurations of hardware components, or through a combination of both a program and hardware components.

In one particular example, the security intelligent controller 202 may utilize caches within the controller to move data in and out of the memory 210. As such, the data may be moved in and out of the memory 210 in a cache line size (e.g., 64 bytes of data for some processors/security intelligent controllers). However, some encryption algorithms are limited in the size of a block of data that may be encrypted. For example, an AES 128-bit algorithm may be limited to 128 bit input value for encryption and an AES 256-bit algorithm may be limited to a 16 byte input value. Thus, the data intended to be encrypted by the security intelligent controller 202 may be split into blocks of an appropriate size for the encryption algorithm used to encrypt the data. In one example, the security intelligent controller 202 may encrypt the data with integrity and anti-replay through an AES algorithm in counter mode combined with AES-GCM tag computation for each cache line. Therefore, each cache line may have a version number (for anti-replay) and a tag (or hash for integrity). The number of bits used for the version number may be selected by the algorithms utilized by the security intelligent controller (e.g. 64 bits or higher) to prevent wraparound for multiple years of operations (e.g. 2048 years). Similarly, the number of bits used for the tag value may be high enough to minimize a probability of collision. In one example, the tag value may be 64 bits or higher. Therefore, for each cache line, at least 64×2=128 bits may be used for the counter value and the tag value.

At operation 502, the security intelligent controller 202 may generate a counter block that includes at least an address value for a corresponding memory location (also referred to as a "cache line" as the security intelligent controller moves data into and out of the memory 210 in a cache line size) concatenated with a counter value of the corresponding to the cache line to generate a counter block of data. As mentioned above, the security intelligent controller 202 may maintain a counter with a counter value for each cache line stored in memory 210. Upon retrieval of data from the memory, the security intelligent controller 202 may determine if the counter value of the retrieved data matches the value of the corresponding counter to ensure the retrieved data is the most recently stored data in the cache line. Thus, the counter value associated with the cache line to be written to may be included in the counter block with the memory location value or address of the cache line. In one example, the counter value is a 64-bit counter value. In addition, the counter block may be encrypted using a confidentiality key through an encryption algorithm. In one example, the encryption algorithm may be an AES algorithm, although other algorithms may be used.

At operation 504, the encrypted counter block may be combined with the plaintext of the cache line or a portion of the cache line to generate the ciphertext. In one example, the encrypted counter block may be combined with the plaintext through an exclusive OR (XOR) function. In this manner, the plaintext may be converted into the ciphertext through an encryption of the memory address concatenated with the corresponding counter block and then XORed with the plaintext of the cache line or a portion of the cache line. Further, as the encrypted counter block includes the counter value for the corresponding cache line, the ciphertext includes an anti-replay functionality. More particularly, the security intelligent controller 202 may store the counter value included in the counter block in an on-chip memory location, such as a dedicated cache memory location. Upon retrieval of the ciphertext from the memory 210, the security intelligent controller 202 may obtain the counter value from the ciphertext and compare it to the stored counter value to verify the ciphertext was the last cache line stored to the memory location. In addition, the security intelligent controller 202 may include an integrity check on the plaintext by calculating an integrity tag value through operations 506-510 described below.

In particular, the security intelligent controller 202 may encrypt the counter block with an integrity key at operation 506 to generate an integrity counter block. The integrity key may be different than the encryption key used above such that the encrypted counter block is different than the integrity counter block. In one example, the security intelligent controller 202 may utilize an AES algorithm to generate the integrity counter block, although other algorithms may be used. Further, the integrity counter block may be a 128-bit value, in some examples. The security intelligent controller 202 may then, at operation 508, compute an integrity/tag value from the integrity counter block using a secure hashing algorithm such as SHA2, SHA3 or AES-GCM. As an example, the security intelligent controller 202 may compute the integrity/tag value by first encrypting the memory address of a data block (e.g., 128 bits) concatenated with corresponding cache line counter value using the integrity symmetric encryption key to generate the integrity counter block, as described above. This integrity counter block, or a portion of the block, may be XORed with the results of finite field multiplications between chunks (e.g., 64 bits) of the previously computed ciphertext and corresponding random numbers generated by a digital random number generator. Each output of the finite field multiplications between the ciphertext chunks and the corresponding random numbers may be XORed and then combined (through an XOR operation) to generate a finite field multiplication result value. The finite field multiplication result may, at operation 510, be combined (such as through an XOR operation) with the integrity counter block or a portion of the integrity counter block to generate the integrity tag value for the corresponding cache line. These operations may occur at the time of configuring the encryption with integrity and anti-replay features by the security intelligent controller. The security intelligent controller 202 may also encrypt the integrity tag value such that a malicious party may not replicate the tag value during an attack on the data. Other algorithms and procedures for generating an encrypted integrity tag value may be utilized by the security intelligent controller 202. In some examples, the encrypted tag value may be truncated to a particular size for ease of storage (e.g., a 64-bit tag value) and stored for later comparison. For example, upon retrieval of the ciphertext from the memory component (e.g., memory 210), the security intelligent controller 202 may run the obtained ciphertext through the same procedure described above to generate a test integrity tag value. The test integrity tag value may be compared to the stored integrity tag value and, if the tags match, the ciphertext is valid and may be decrypted using the confidentiality key and processed. However, if the integrity tags do not match, the ciphertext may be corrupted and one or more mitigation techniques or procedures may be performed on the ciphertext to either fix the corruption or to discard the corrupted ciphertext before processing by the security intelligent controller 202.

Through the above steps, a counter value associated with a memory location in memory 210 may be generated and included in the ciphertext of the plaintext data to be stored. In addition, an integrity tag value may be generated corresponding to the ciphertext. In one particular example, the encryption with integrity and anti-replay may use a 64-bit counter value and a 64 bit tag value. However, maintaining the counter value and the tag value in memory components of the security intelligent controller 202 may consume large areas on the controller die. For example, many processing devices include an on-die cache structure for fast storage and access of some data. The counter values and tag values for data transmitted to memory 210 may be stored in such dedicated cache structures to maintain the security over the values. For some controllers, however, the counter values and tag values for the data stored in memory 210 may consume a large amount of available cache space within the controller.

Figure 6:
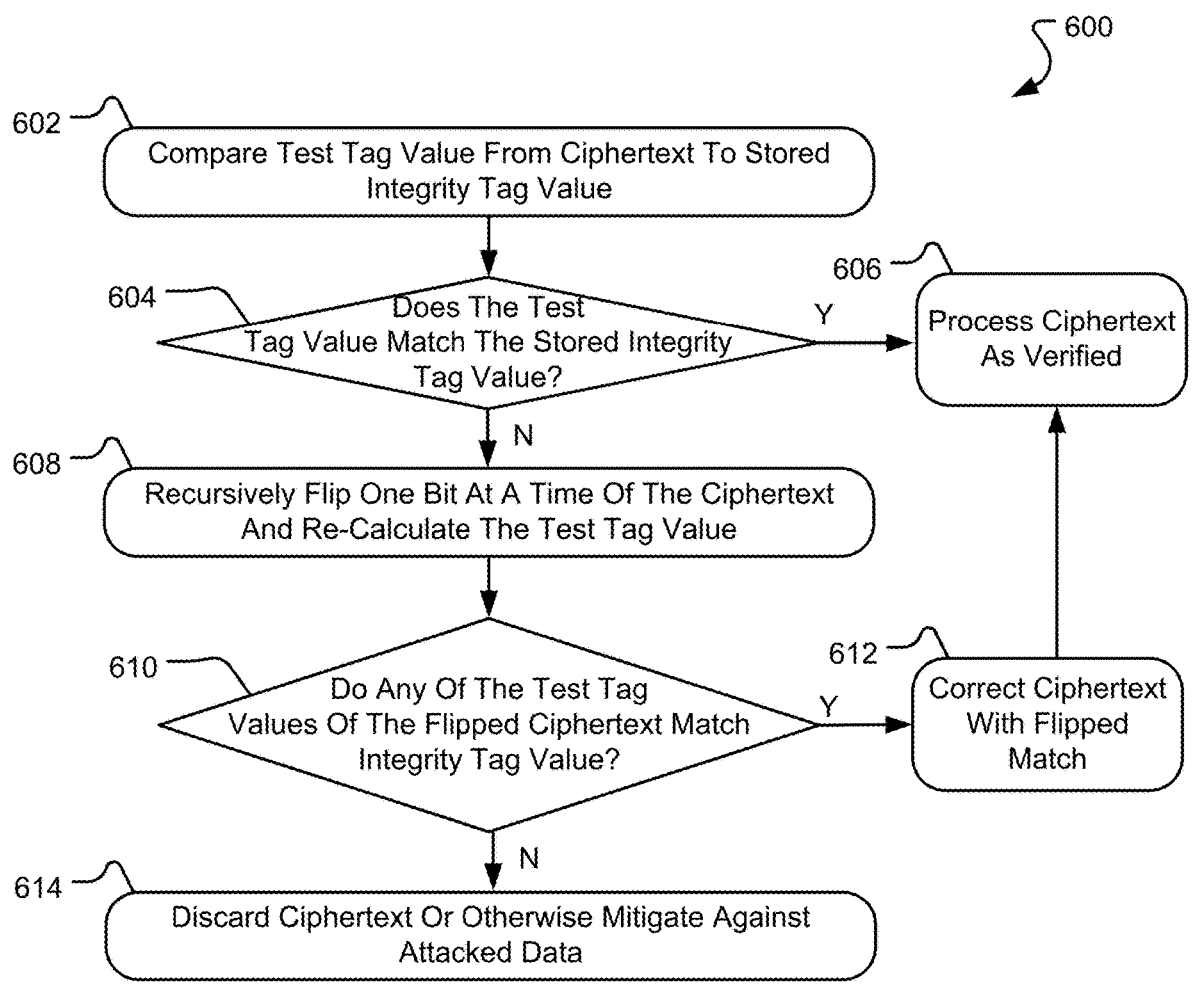
FIG. 6 is a flowchart illustrating an example of a method (or process) for error correcting stored data utilizing an integrity tag value, in accordance with some examples.

In response, the security intelligent controller 202 may be configured to store the counter values and tag values that reduces the overall consumption of on-die cache space. In one example, the integrity/tag value may be stored in the dedicated error correction code (ECC) bits portion of the memory 210 cache line in operation 512. This approach may reduce the memory storage needed for integrity and anti-replay by portion of memory 210 reserved for ECC storage of the stored cache lines and removing the tag values from the cache structure of the security intelligent controller 202. In addition, the tag value stored in the ECC portion may be used to detect any number of flipped bits in the stored ciphertext and correct for any single flipped bit. In particular, FIG. 6 is a flowchart illustrating an example of a method (or process) 600 for error correcting stored data utilizing an integrity tag value, in accordance with some examples. The security intelligent controller 202 may perform one or more of the operations of the method 600 through a firmware/software program or one or more hardware components of the controller.

At operation 602, the security intelligent controller 202 may compare an integrity tag value derived from the ciphertext, also referred to herein as a "test tag value", to a stored integrity tag value. The stored integrity tag value may be computed as described above with relation to FIG. 5. The security intelligent controller 202 may undertake similar operations to compute the test tag value from the ciphertext obtained from the memory 210. At operation 604, the security intelligent controller 202 may compare the test tag value to the stored integrity tag value to determine if the tag values match. If the tags match, then the security intelligent controller 202 has verified the stored ciphertext as valid and may process the ciphertext according to an executing application at operation 606. However, if the tag values do not match, then one or more of the bits of the ciphertext may have been changed, either accidentally or in response to an attack on the stored data. In such cases, the security intelligent controller 202 may flip one bit of the obtained ciphertext, recalculate the test tag value, and compare the recalculated test tag value against the integrity tag value at operation 608. This process may continue recursively, one bit at a time, until each bit has been changed and the tag values have been compared or a match of the tag values has been determined. Thus, at operation 610, the security intelligent controller 202 may determine if any of the recalculated test tag values of the flipped ciphertext match the integrity tag value. If one of the test tag values of the flipped ciphertext matches the integrity tag value, the security intelligent controller 202 may, at operation 612, correct the ciphertext obtained from the memory 210 to the ciphertext from which a test tag value is derived that matches the integrity test value. The corrected ciphertext may also be processed as verified at operation 606 following the correction. However, if the tags do not match through the recursive attempts to correct the bit flip, then the detected bit flip may be a hardware attack or an accidental multiple bit flip which is typically an uncorrectable error. The security intelligent controller 202 may, in such circumstances, discard the uncorrectable ciphertext data at operation 614 to mitigate against a possible security attack.

Figure 7:
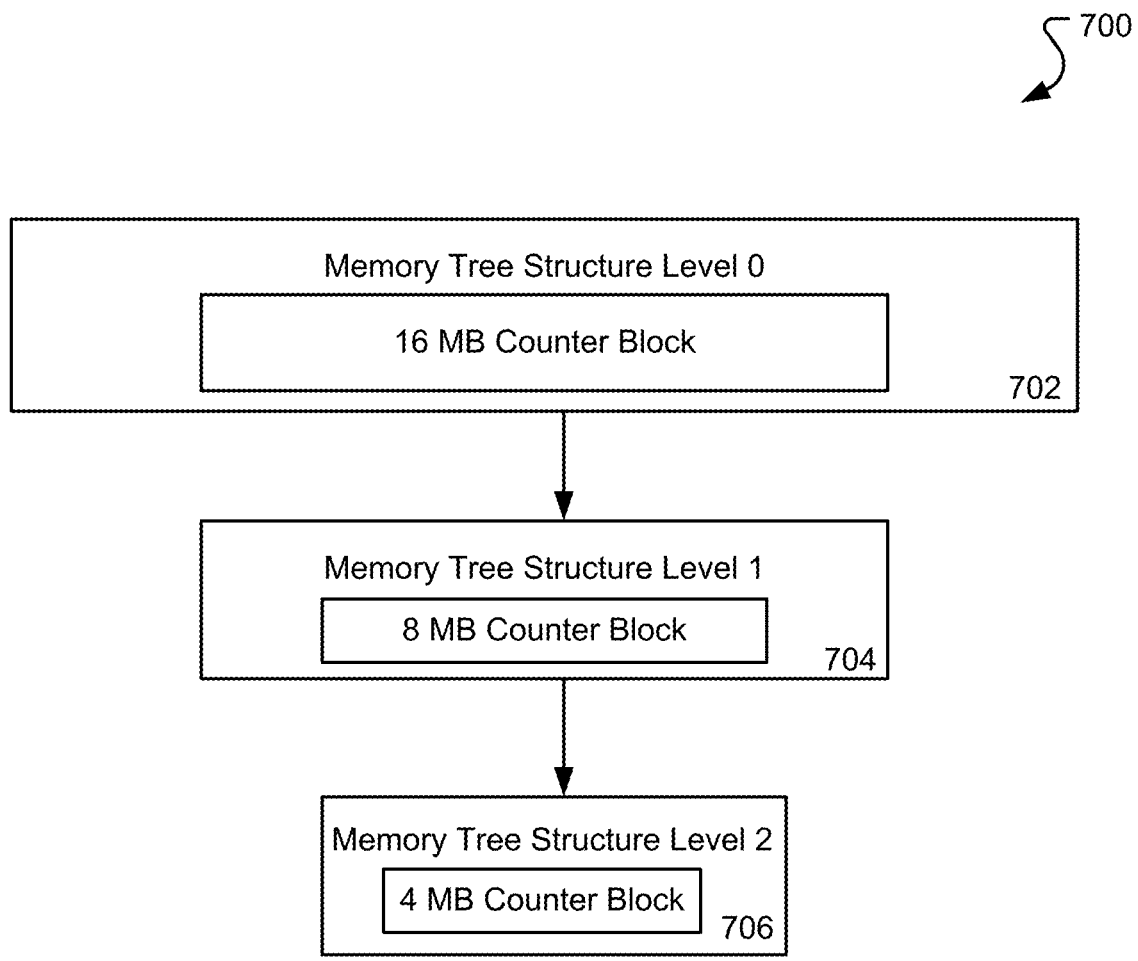
FIG. 7 is a schematic diagram of a memory tree structure for storing counter values of data, in accordance with some examples.

Storing the integrity tag value in the memory 210 in a portion reserved for ECC bits may reduce the security intelligent controller's 202 on-chip storage while detecting any bit flop in a cache line and correcting single bit flip occurrences. The counter values associated with cache lines intended for the memory 210 may also be stored in a manner to reduce the consumption of cache space within the security intelligent controller. In particular, because of the large size required for storing the counter values (which may not be able to fit inside on-chip caches), a tree structure with corresponding on-die caches must be used for protecting the counters with integrity and anti-replay. Further, counters from multiple successive cache lines may be cached together in the memory 210 and the on-die caches corresponding to each tree level may be configured in such a way that the cache lines containing the cache misses may be minimized. For example, a security intelligent controller 202 supporting 128 gigabytes (GB) of memory 210 encrypted with integrity and anti-replay may use a memory tree structure with three levels, an example of which is illustrated in FIG. 7 illustrating a memory tree structure for storing counter values of data, in accordance with some examples. More particularly, the tree structure 700 is a visual representation of the memory space reserved in the memory 210 and/or a corresponding cache of the security intelligent controller 202 for storing the counter values while maintaining integrity and anti-replay of the counter values.

A first level of the memory tree structure (level 0) 702 may be the largest level of the tree structure 700, consuming both the largest memory 210 space and the largest on-die cache space of the security intelligent controller 202. In one example, level 0 may use eight cache lines for counters, organized in a block (covering an 8×8=64 block of cache lines or a 64×64=4 kilobytes (KB) non-volatile memory page per counter block). The level 0 cache may be 16 megabytes (MB) of on-die cache (or other memory component) organized as a 16-way set associative, with 32K sets cache covering 128 MB of non-volatile memory. A second level of the memory tree structure (referred to as a level 1 704, which can include level 1 cache may use the same eight cache lines for counters as a block (covering 8×8=64 4 KB memory 210 pages or a 256 KB page per counter block). The level 1 704 cache may be 8 MB of on-die cache organized as a 16-way set associative, 16K sets cache covering 4 GB of non-volatile memory. The level 2 cache 706 may use the same 8 cache lines for counters as a block (covering 8×8=64 256 KB non-volatile memory pages or a 16 MB page per counter block). The level 2 cache 706 may be 4 MB of on-die only cache memory organized as a 16-way set associative and 8K sets cache covering 128 GB of memory 210.

To maintain the security over the counter values, the security intelligent controller 202 may maintain a root counter value (stored on-die in the level 2 cache 706). The root counter value may not be a counter value associated with a cache line of ciphertext or other data used by an executing program. Rather, the root counter value may be a counter value for the memory locations of the counter values stored in the memory 210. In other words, counter values may be combined as described above into cache lines which may be stored in the memory 210. Each of those cache lines may be associated with a counter value that is stored in the memory 210 at the level 1 704 of the tree structure. The cache lines of the level 1 704 of the tree structure may also be associated with a counter value. The counter values for the cache lines of tree structure level 1 may be referred to as a "root" counter value and may be stored in a cache component of the security intelligent controller 202. In this manner, the security intelligent controller 202 may maintain control over the root counter values without transmitting such values off the of the controller die. Further, because there are fewer root counter values, the entire 128 GB of the counter space of the memory 210 may be covered by the counters stored on-die of the security intelligent controller 202 without consuming all or most of the available cache space. It should be appreciated that any number of levels may be included in the tree structure 700, with the root counter values corresponding to counter values of cache lines stored in a lower level of the tree structure.

Returning to the method 500 of FIG. 5, the security intelligent controller 202 may calculate the root counter values for the counters stored in the tree structure at operation 514. As described, the root counter values may be counter values for cache lines of other levels of the tree structure. At operation 516, the security intelligent controller 202 may store the root counter values in an on-die cache component of the controller to maintain security over the root counter values. At operation 518, the security intelligent controller 202 may store counter values corresponding to cache lines of the memory 210 in a reserved portion of the non-volatile memory. Storing of counter values in the memory 210 may cause the security intelligent controller 202 to recalculate a corresponding root counter value and update the on-die cache component according to the recalculation. This process may be executed for each update to a counter stored in the memory 210 to maintain integrity and anti-replay of the data stored to memory.

In some implementations, it may not be practical to use a large die area for counters such that the memory encryption with integrity and anti-replay may only cover a subset of the memory 210. For this circumstance, system software (e.g., hypervisor/virtual machine or other operating system) may use a paging mechanism with or without virtualization to only expose the memory protected by the memory encryption with integrity and anti-replay to the applications and treat the rest of the memory as plain memory. In this manner, the memory may be partitioned into a portion of the memory encrypted with integrity and anti-replay and the rest of the memory not used to store the encrypted data with integrity and anti-replay. When a page miss occurs, the system software may select a victim page from the pool of pages protected by the memory encryption with integrity and anti-replay, encrypt the victim page with integrity and anti-replay, and store it in its corresponding location of the memory not encrypted with integrity and anti-replay. The system software may then load the requested page from its corresponding location of memory, decrypt it, and compute its integrity tag and compare it with the expected integrity tag, as described above. The system software may then broadcast a remote translation lookaside buffer (TLB) shutdown to all the executing threads in the system and map the requested page into the paging structure and restart the threads operation.

In this implementation, the system software processes the per-page counter and tags, caches them appropriately in the memory region protected by the memory encryption with integrity and anti-replay hardware engine and swaps pages containing counters and tags to and from the memory not encrypted with integrity and anti-replay. In order to minimize the impact on the system software, the manageability of the counters and tags may be implemented in firmware (microcode) that will perform the page swapping with encryption, integrity and anti-replay and the remote TLB shutdown triggered by a software API. If all the threads in the computer system cannot saturate the non-volatile memory bandwidth for AES encryption in counter mode plus AES-GCM tag computation, the memory encryption with integrity and anti-replay hardware engine may be enhanced to perform these operations automatically and can be used in conjunction with the firmware (microcode) implementation. In other words, a hardware engine implementing page swapping including encryption/decryption with integrity and anti-replay may be used for performance reasons instead of a firmware-based implementation.

Figure 8:
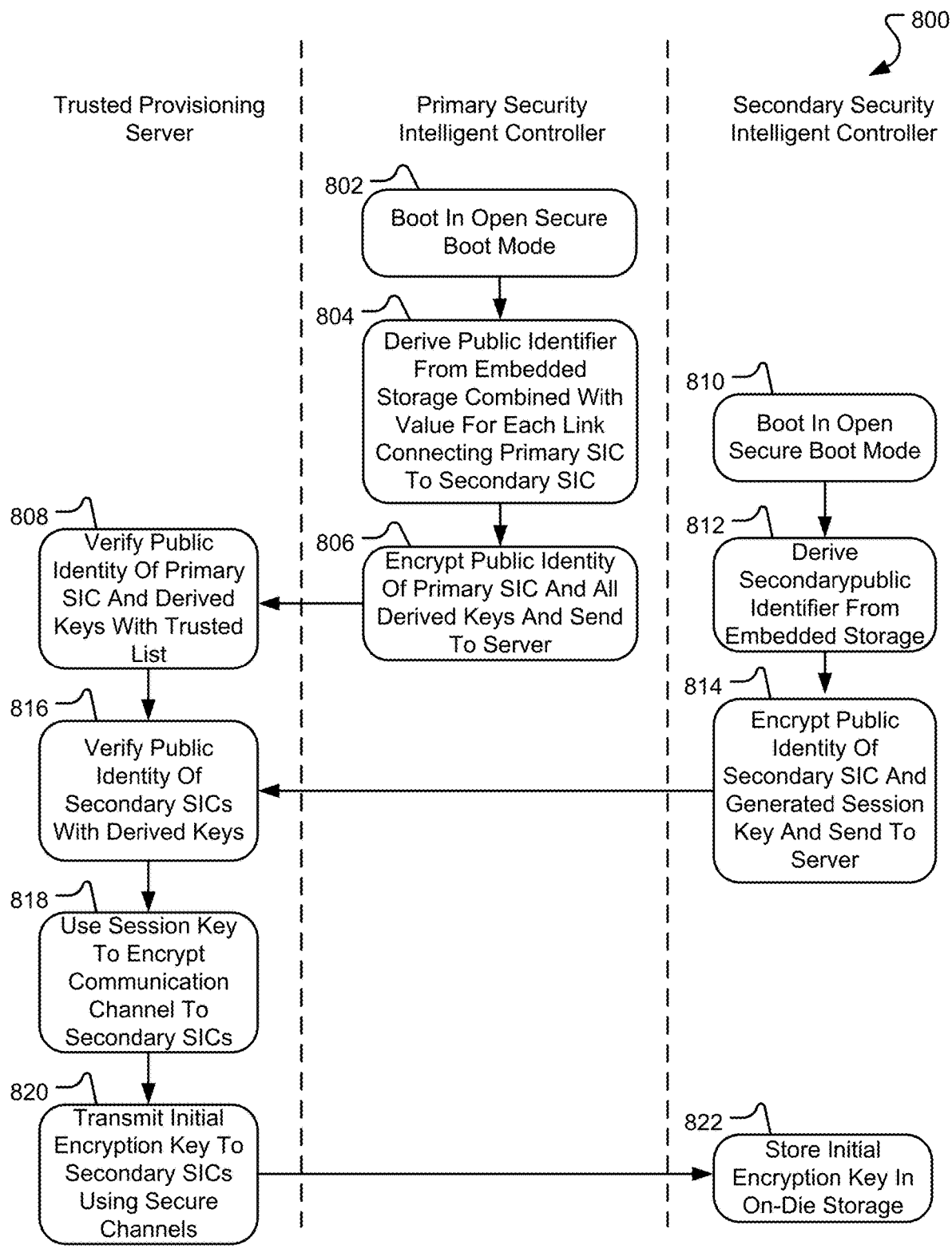
FIG. 8 is a flowchart illustrating an example of a method (or process) for provisioning components of a computing system for a secure boot process, in accordance with some examples.
Figure 9A:
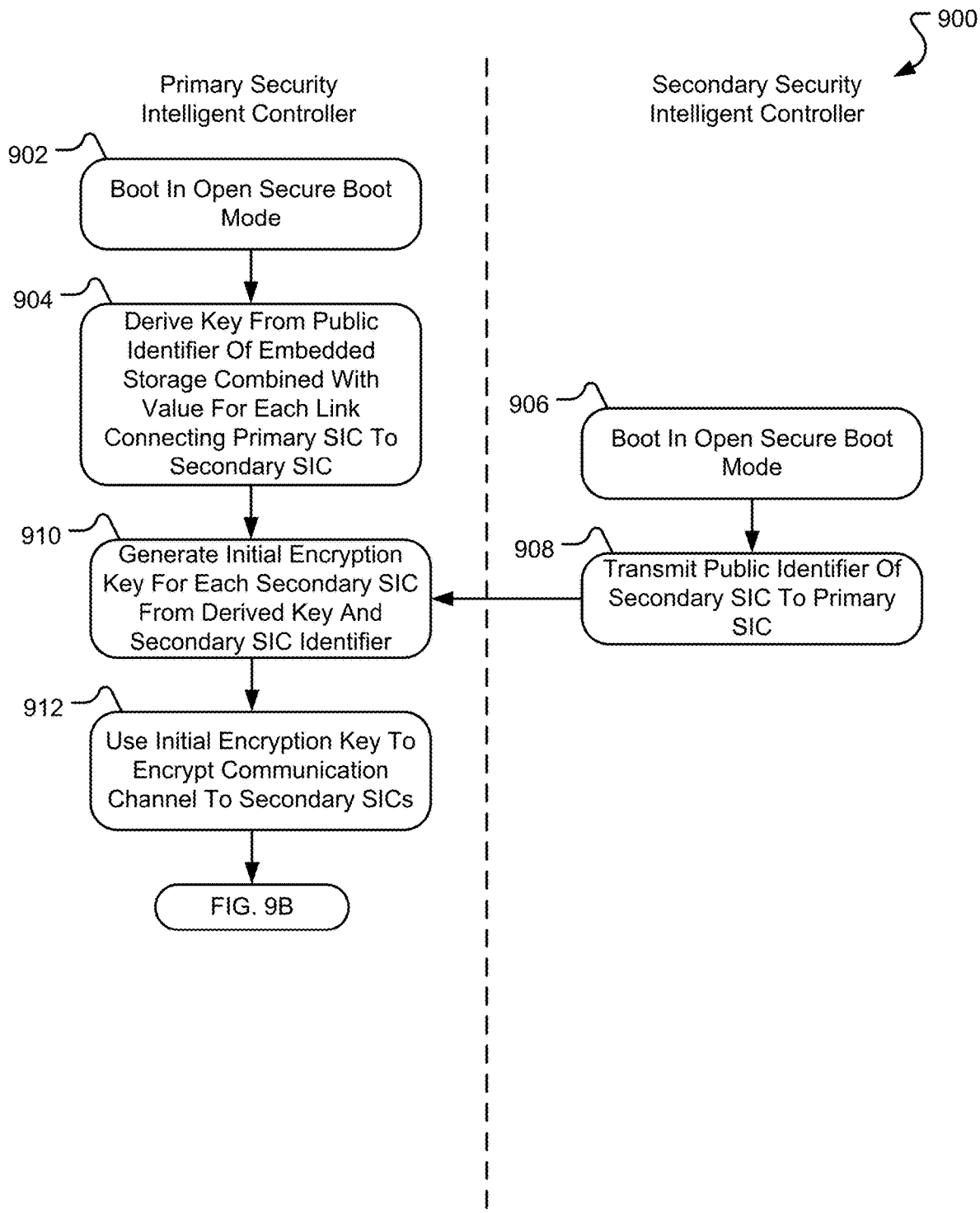
FIGS. 9A and 9B is a flowchart illustrating an example of a method (or process) for executing a secure boot of a processing device that has been pre-provisioned, in accordance with some examples.
Figure 9B:
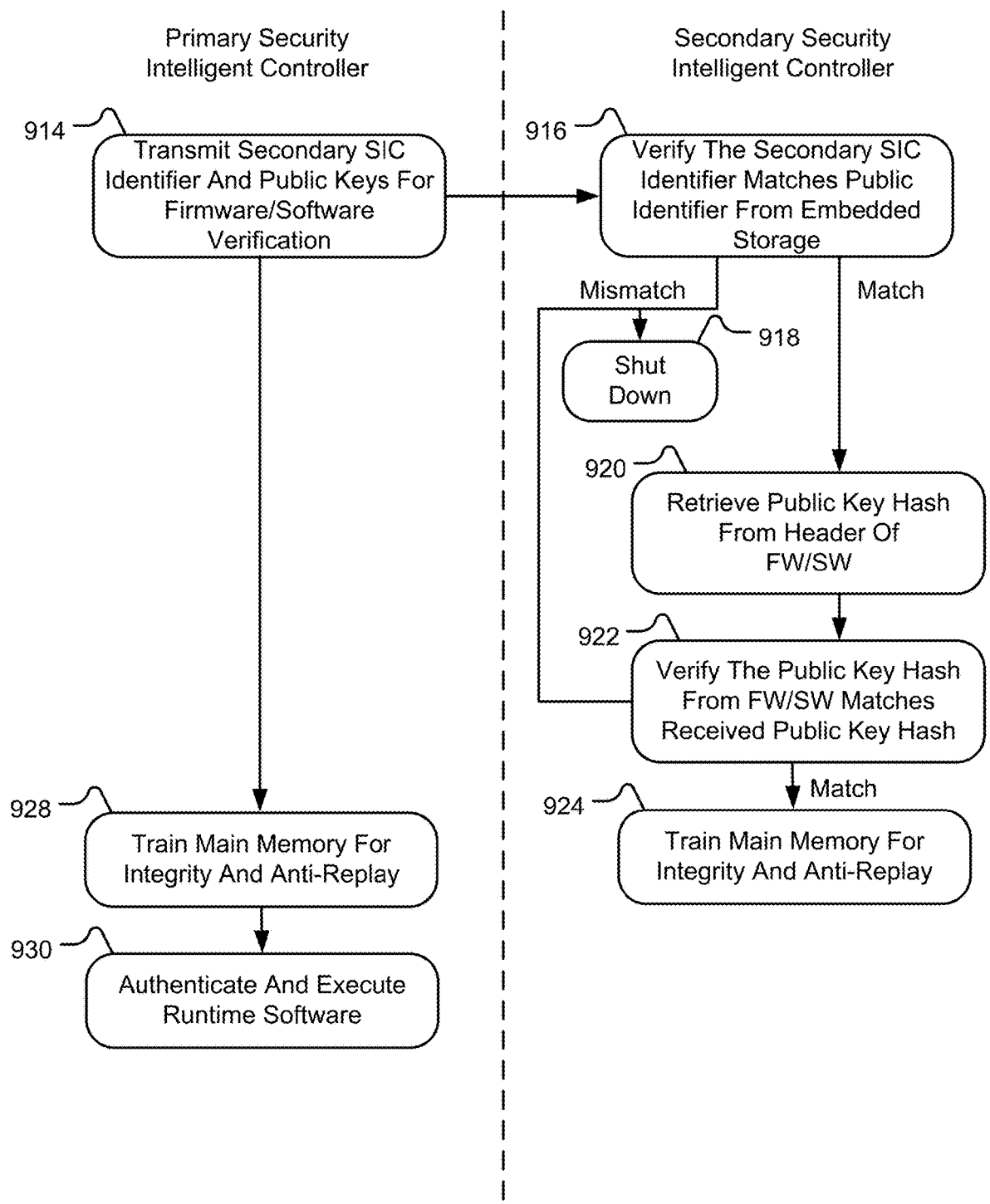

The dynamic secure boot procedure discussed above with reference to FIGS. 4A-4C provides one type of secure boot procedure for confidential computing. FIGS. 8 & 9A-9B illustrate an open secure boot procedure for a local computing device that may be used in closed systems, such as within a control system of an airplane or other system in which access through a network connection is not available. As mentioned above, the open secure boot procedure may include two phases: a provisioning phase implemented at a trusted manufacturing facility and a post-provisioning phase implemented within the closed system. FIG. 8 is a flowchart illustrating an example of a method (or process) 800 for provisioning components of a computing system for a secure boot process and FIGS. 9A and 9B is a flowchart illustrating an example of a method (or process) 900 for executing a secure boot of a processing device that has been pre-provisioned, in accordance with some examples. The methods 800, 900 may include operations executed or performed by one or more security intelligent controllers (such as processing device 202 of computer system 250), one or more secondary security intelligent components (such as secure system management device 208), and/or the local computing devices, such as a trusted provisioning server located at a trusted manufacturing facility of the closed system computer system. The operations may be performed through execution of one or more programs, one or more hardware components, or a combination of both programs and hardware components of any of the above listed components or devices.

As mentioned, the provisioning phase may be done at a trusted manufacturing facility that may maintain full control of all the security intelligent controllers (primary and secondary), the hardware connecting them (such as interfaces and transmission lines), and the initial firmware/software executed by the security intelligent controllers. At operation 802, a primary security intelligent controller (e.g., the security intelligent controller 202) may boot in an open secure boot mode. The open secure boot mode provides for testing and configuration of the security intelligent controller at the manufacturing facility or other trusted testing site. At operation 804, the primary security intelligent controller 202 derives a public identifier value for each link of the closed computer system 250 connecting a primary security intelligent controller 202 a secondary security intelligent controller (e.g., the secure system management device 208). For instance, the primary security intelligent controller 202 may obtain a private identifier value from a secure physical object embedded on the controller in a similar manner as discussed above. The secure physical object may be one or more of programmable fuses, one or more lockable on-chip non-volatile memory units, or one or more physically unclonable functions (PUFs), among other secure physical objects. The primary security intelligent controller 202 may execute a key derivation algorithm (such as through a secure hash algorithm like a SHA-2 or SHA-3 algorithm) that combines the private identity value with a fixed value for each link used to connect the primary security intelligent controller with all the secondary security controllers (e.g., the secure system management device 208, etc.) in the computer system 250. Through the key derivation, a public identity for the primary security intelligent controller 202 may be generated for each communication link connecting the primary security intelligent controller to a secondary security intelligent controller of the computer system 250.

At operation 806, the primary security intelligent controller 202 may encrypt, using a public identity key associated with the trusted provisioning server obtained from a firmware/software executed by the primary security intelligent controller, a public identity of the primary security intelligent controller and one or more of the derived keys. This encrypted data blob may be transmitted to the trusted provisioning server. At operation 808, the trusted provisioning server uses its private key to decrypt the encrypted blob to obtain the public identity value of the primary security intelligent controller 202 and all the above derived keys and verifies that the public identity value of the primary security intelligent controller 202 and included in the encrypted data blob matches a value in a list of trusted identities maintained by the trusted server. In this manner, the trusted provisioning server may authenticate the encrypted blob transmitted from the primary security intelligent controller 202.

At operation 810, the secondary security intelligent controllers (e.g., the secure system management device 208, etc.) also boot in an open secure boot mode and a public identity value for each of the secondary security intelligent controllers is obtained, at operation 812, in a similar manner as described above. Initial firmware/software executed by each secondary security intelligent controller may include an embedded public key corresponding to the trusted provisioning server and, at operation 814, the secondary security intelligent controller encrypts the public identity of the secondary security intelligent controller along with a randomly generated encryption session key and sends the encrypted data to the trusted provisioning server at operation 814.

At operation 816, the trusted provisioning server uses its private key to decrypt the public identity of each secondary security intelligent controller and each encryption session key. Further, the trusted provisioning server may verify that the public identity of each secondary security intelligent controller matches against a list of trusted identities maintained by the trusted server. In this manner, the trusted provisioning server may authenticate the encrypted data is transmitted from the secondary security intelligent controllers 208 (e.g., the secure system management device 208, etc.).

With the primary security intelligent controller 202 and the one or more secondary security intelligent controllers (e.g., the secure system management device 208, etc.) authenticated at the provisioning server, the trusted provisioning server may perform a key derivation algorithm for each secondary security intelligent controller 208 at operation 818 by performing a secure hash of the corresponding derived key received from the primary security intelligent controller 202 in the encrypted data blob. The key derivation algorithm may be the same key derivation algorithm the primary security intelligent controller 202 executes above with reference to operation 804. The key derivation algorithm may include performing the secure hash on the corresponding derived key associated with a given secondary security intelligent controller (e.g., the secure system management device 208, etc.) with the public identity received from the corresponding secondary security intelligent controller. At operation 820, the trusted provisioning server uses the encryption session key received from a corresponding secondary security intelligent controller (e.g., the secure system management device 208, etc.) to create an encrypted communication channel with that device and send the above computed secure hash to it. In general, the encryption session key may serve as an initial encryption key between the primary security intelligent controller and the corresponding secondary security intelligent controller to create a secure communication channel between the controllers. At operation 822, the secondary security intelligent controllers (e.g., the secure system management device 208, etc.) may store the corresponding initial encryption key in on-die, storage for use during the post-provisioned phase, described in more detail below with reference to FIGS. 9A-9B. In some examples, the secondary security intelligent controllers can be de-provisioned when a null key value is received from the trusted provisioning server.

The method 800 of FIG. 8 provisions the primary and/or secondary security intelligent controllers of the closed computer system 250 such that the controllers may be deployed into the field for use in the closed system. FIGS. 9A and 9B is a flowchart illustrating an example of a method (or process) 900 for executing a secure boot of a processing device that has been provisioned, in accordance with some examples. The post-provisioned phase happens after the closed system containing all the security intelligent controllers (primary and secondary) is provisioned and deployed in the field.

Referring to FIG. 9A, at operation 902, the primary security controller 202 of the closed computer system 250 may be booted in an open secure boot mode. Further, similar to operation 804 of the provisioning phase, the primary security intelligent controller 202, at operation 904, may derive a public identifier value for each link of the closed computer system 250 connecting a primary security intelligent controller 202 a secondary security intelligent controller (e.g., the secure system management device 208, etc.). In particular, the primary security intelligent controller 202 may obtain a private identifier value from a secure physical object embedded on the controller. The primary security intelligent controller 202 may execute a key derivation algorithm (such as through a secure hash algorithm like a SHA-2 or SHA-3 algorithm) that combines the private identity value with a fixed value for each link used to connect the primary security intelligent controller with all the secondary security controllers (e.g., the secure system management device 208, etc.) in the computer system 250. Through the key derivation, a public identity for the primary security intelligent controller 202 may be generated for each communication link connecting the primary security intelligent controller to a secondary security intelligent controller of the computer system 250.

At operation 906, one or more of the secondary security intelligent controllers (e.g., the secure system management device 208, etc.) may boot in an open boot mode and wait for information from the primary security intelligent controller 202. At operation 908, primary security intelligent controller 202 may request and receive a public identifier for each of the secondary security intelligent controller connected to the primary security intelligent controller. At operation 910, the primary security intelligent controller 202 executes a secure hash algorithm of each of the above-derived keys concatenated with the public identity of the corresponding secondary security intelligent controller to generate an initial encryption key for each link to the secondary security intelligent controllers at operation 912. In particular, the primary security intelligent controller 202 may use the corresponding initial encryption keys to establish a secure communication channel with each secondary security intelligent controller for secure transmission of data between the security controllers.

Turning to FIG. 9B, the primary security intelligent controller 202 may use the secure communication channels with each secondary security intelligent controller (e.g., the secure system management device 208, etc.) to transmit, at operation 914, the secondary security intelligent controller's public identity and the public key that the secondary security intelligent controller may use for authentication. The primary security intelligent controller 202 may also transmit, via the secure communication channel, an initial firmware/software and a minimum revision level for the initial firmware/software. In one example, all of the information transmitted at operation 914 may be embedded in an initial firmware/software maintained by the primary security intelligent controller 202.

At operation 916, the secondary security intelligent controller (e.g., the secure system management device 208, etc.) may verify that the public identifier value received from the primary security intelligent controller 202 matches the secondary controller's public identifier value stored in the physical object embedded storage. If the public identifier values do not match, the secondary security intelligent controller cannot authenticate the identity of the primary security intelligent controller 202 and may shut down at operation 918. If the public identifier value of the secondary security intelligent controller matches the received public identifier, the secondary security intelligent controller may, at operation 920, retrieve a hash of the session public key from a header of the firmware/software. At operation 922, the secondary security intelligent controller may authenticate the firmware/software by verifying that the hash of the session public key obtained from firmware/software header matches the hash value of the session public key received from the primary security intelligent controller 202. If the hash of the session public keys do not match, the secondary security intelligent controller cannot authenticate the firmware/software as received and the secondary security intelligent controller may perform shut down.

If the hash of the session public key obtained from the firmware/software package matches the hash of the session public key received from the primary security intelligent controller 202, the secondary security intelligent controller (e.g., the secure system management device 208, etc.) may also authenticate and execute runtime software on the closed computer system 250 as a secure component of the system at operation 926. The secondary security intelligent controller may store the authenticated firmware/software in one or more of the memory components of the computer system 250. The primary security intelligent controller 202 and the secondary security intelligent controller may also begin execution of the respective firmware/software. In one example, the secondary security intelligent controller may train one or more portions of the main memory (e.g., memory 210) for integrity and anti-replay features of storing data at operation 924 as described above. In a similar manner, the primary security intelligent controller 202 may train one or more other portions of the main memory for integrity and anti-replay features of storing data at operation 928 and/or authenticate and execute runtime software on the closed computer system 250 as a secure component of the system at operation 930.

Through the methods described above, the security intelligent controller 202 may employ dynamic secure boot to establish point-to-point secure communication channels. The secure communication channel may be used to send and receive information between any two computing devices or components. In one example, the secure communications transmitted over the channel may include a header that is not encrypted but is covered as part of the integrity tag, with the data payload being encrypted with integrity and anti-replay and the ciphertext as part of the integrity tag. PCIe, CXL (or any link) encryption may be done point-to-point (excluding PCIe bridges for the PCIe case) and using AES encryption in counter mode coupled with AES-GCM tag computation.

In one example and to minimize the latency impact, a PCIe (or any link) encryption hardware engine may precompute 10 AES encryptions of an incremented counter concatenated with a random initialization vector. The plaintext blocks of data may be XORed with the corresponding AES encrypted values (precomputed initially) and then the AES-GCM tag is computed on the ciphertext (the AES-GCM tag can be computed in parallel for a given number of blocks such that the latency of AES-GCM operation is not exposed for a number of subsequent AES-GCM tag computations). As noted, the header is not encrypted but may be included in the AES-GCM tag computation. In one example, the AES-GCM tag may transmitted at the end of the data payload. Further, the security intelligent controller may employ a different AES encryption key for each transmission direction and/or all of the encryption AES keys may be refreshed after a given number of encryption/decryption cycles.

For multiprocessor systems, the point-to-point links between each computer system (for may encrypted with integrity and anti-replay. The mechanism may be similar to the one used for PCIe link encryption with integrity and anti-replay discussed above and the computer systems act as security intelligent controllers that employ dynamic secure boot to establish secure communication channels between each system. In case of multiple device dies on the same package, the point-to-point links between each die may be encrypted with integrity and anti-replay in a similar manner as the PCIe link encryption with integrity and anti-replay discussed above. In this example, the dies may act as security intelligent controllers that employ dynamic secure boot to establish secure communication channels between each die. However, the dynamic secure boot process may be done automatically by the security intelligent controllers (without local/remote computing device involvement) and the hash of the public key belonging to the security intelligent controller on the other end of the link between two devices may be embedded in the fuses of the security intelligent controller on one end of the link.

In one illustrative example, the security intelligent controller 202 may store data in the memory component 210 through a paging system of the memory that utilizes compression of (extended) page table entries using a small page size increase technique. In general, each page of the memory may include multiple entries of stored data indexed within a memory page. Obtaining a particular data block from the pages may include utilizing a portion of a physical address to determine an entry from one of the memory pages that corresponds to data entry. For example, a physical address of a memory location may be determined from a linear address that is used as an index into a page table. The requesting program may utilize the linear address to walk through the page tables of the memory to determine an entry in one of the page tables at which a physical address in the memory component may be obtained. The requested data may be located at the physical address within the memory.

However, page table entries (PTEs) and/or extended page table entries (EPT PTEs) may consume a large portion of the memory 210. For example, some computer systems 250 may dedicate up to $\frac{1}{512}$ of the total available memory capacity of the memory to page table entries or extended page table entries. To compress the amount of memory taken by the page table entries, the security intelligent controller 202 may extend the small page size of the memory pages by having a single page table entry or extended page table entry map to a page size. For example, assume a computer system 250 with a smallest page size of 4 KB. To compress the memory dedicated to the page table entries, a page table entry or extended page table entry may be mapped to an extended page size, such as 8 KB and up to one half of the total size of the memory covered by the page directory entry (PDE) or extended page directory entry. The extension of the smallest page size may be configurable by the security intelligent controller 202 or by software executed by the controller. The extension of the smallest page size may, in effect, keep the small page table and/or extended page table size and instead may alter how the page table or extended page table is walked by a requesting program to compress the data stored in memory for the paging structure of the memory.

Figure 10:
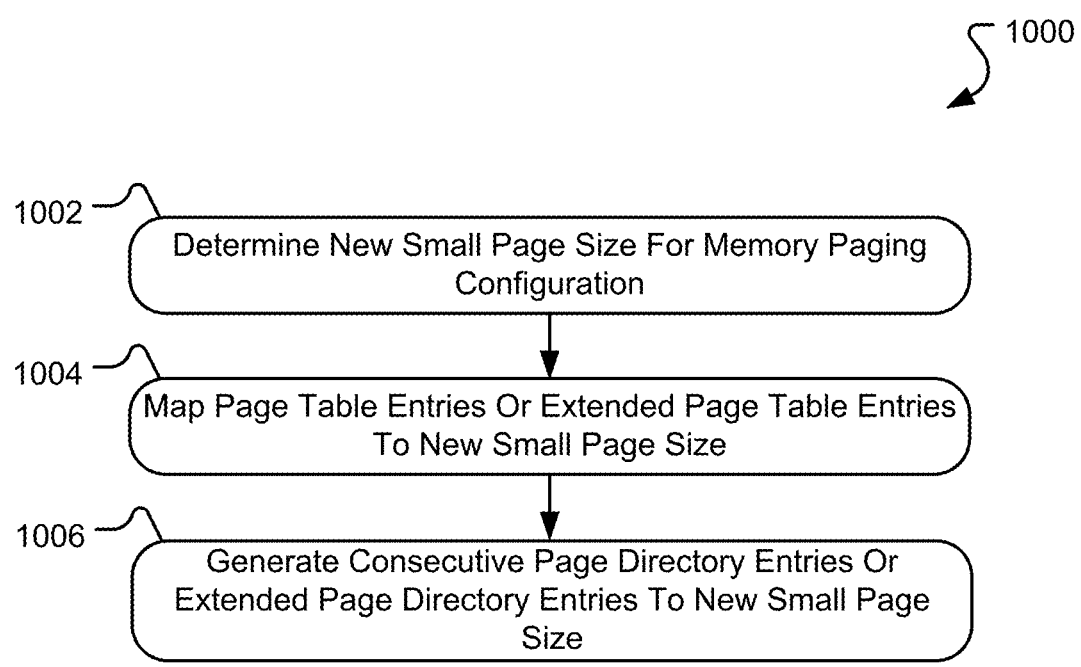
FIG. 10 is a flowchart illustrating an example of a method (or process) for compressing page table entries in a memory paging configuration of a computing system, in accordance with some examples.

FIG. 10 is a flowchart illustrating a method 1000 (also referred to as a process) for compressing page table entries in a memory paging configuration of a computing system, in accordance with some examples. In some examples, the operations of the method 1000 may be performed or executed by the security intelligent controller 202 of the computer system 250, although any processing device may perform the operations of the method. Further, the operations of the method 1000 may be performed through execution of a program and/or through configurations of hardware components of the security intelligent controller or other processing device.

At operation 1002, a new small page size for a memory paging configuration may be determined by the security intelligent controller 202. In one example, the new small page size may be based on hardware constraints of the security intelligent controller 202. For example, the new small page size may be constrained by a type of paging configuration and/or the reserved bits in one or more registers associated with accessing the memory paging configuration used by the security intelligent controller 202. In another example, the new small page size may be dynamic and selectable by the security intelligent controller. In this example, the new small page size may be defined per PDE or EPT PDE by using a combination of reserved or ignored bits in these entries to form an index into a table with multiple small page sizes, ranging from the legacy small page size to one or more new small page sizes. For systems in which the new small page size may be dynamically changed, the security intelligent controller 202 may select a new small page size for the memory paging configuration based on a system operational measurement, such as a memory space requirement requested by an executing program.

At operation 1004, the security intelligent controller 202 may map one or more page table entries or extended page table entries to the selected new small page size. For example, assume a security intelligent controller 202 that uses a linear address size of 48 bits and a physical address size of 46 bits. In such a configuration, the smallest page size may be 4 KB. The device physical address for a 4 KB page frame may include bits [45:12] corresponding to the physical address and bits [11:0] corresponding to the linear address. To extend the small page size to 128 KB, the address for the 128 KB page frame may include bits [45:17] corresponding to the physical address and bits [16:0] corresponding to the linear address [16:0]. Further, the page table entry (PTE) or extended page table entry (EPT) bits [16:12] for the page frame may be are ignored by the security intelligent controller. A similar same algorithm may be applied for any page size between 8 KB up to 1 MB. In addition, for the same 4 KB smallest page size, the address of the page table from the PDE or extended PDE may be changed from bits [45:12] corresponding to the physical address and bits [20:12] corresponding to the linear address to bits [45:12] corresponding to the physical address and bits [25:17] corresponding to the linear address for a smallest page size of 128 KB. Again, a similar algorithm may be applied for any page size between 8 KB up to 1 MB.

In this example, because the size of the page table and extended page table is kept at 4 KB, the platform physical address range covered by a page table or extended page table grows from 2 MB (4 KB/8-byte page table entry size/extended page table entry size=512 entries×4 KB page size) to 64 MB (4 KB/8-byte page table entry size/extended page table entry size for =512 entries×128 KB). Larger coverage by the page table or extended page table may be obtained through mapping to an even larger page size.

Because the size of the page directory table and extended page directory table is also kept at 4 KB, the address range covered by a page directory table or extended page directory table entry is still 2 MB. To account for this discrepancy, the security intelligent controller 202 may, at operation 1006, generate a plurality of consecutive page directory entries or extended page directory entries equal to the new small page size. Each of the page directory entries may point to the same page table or extended page table and align as a group with respect to the linear address range covered by the group. A boundary corresponding to the size of the physical address range covered by an entire page table or entire extended page table may also be set. Continuing the above example of a smallest page size of 128 KB, 32 consecutive page directory entries or extended page directory entries pointing to the same page table or extended page table and aligned as a group with respect to the linear address range they cover, up to a 64 MB boundary may be included in the page directory table or extended page directory table.

The method 1000 may, in some security intelligent controllers, be implemented through reserved bits in a dedicated register for the memory paging configuration or through virtual machine execution control. Also, the page directory table or extended page directory table may be readable/writeable from privileged software through the registers or via the virtual machine execution controls. Regardless of the implementation, the security intelligent controller may compress the amount of memory taken by the page table entries by extending the smallest page size of the memory pages, providing additional memory space in the computer system 250.

Figure 11:
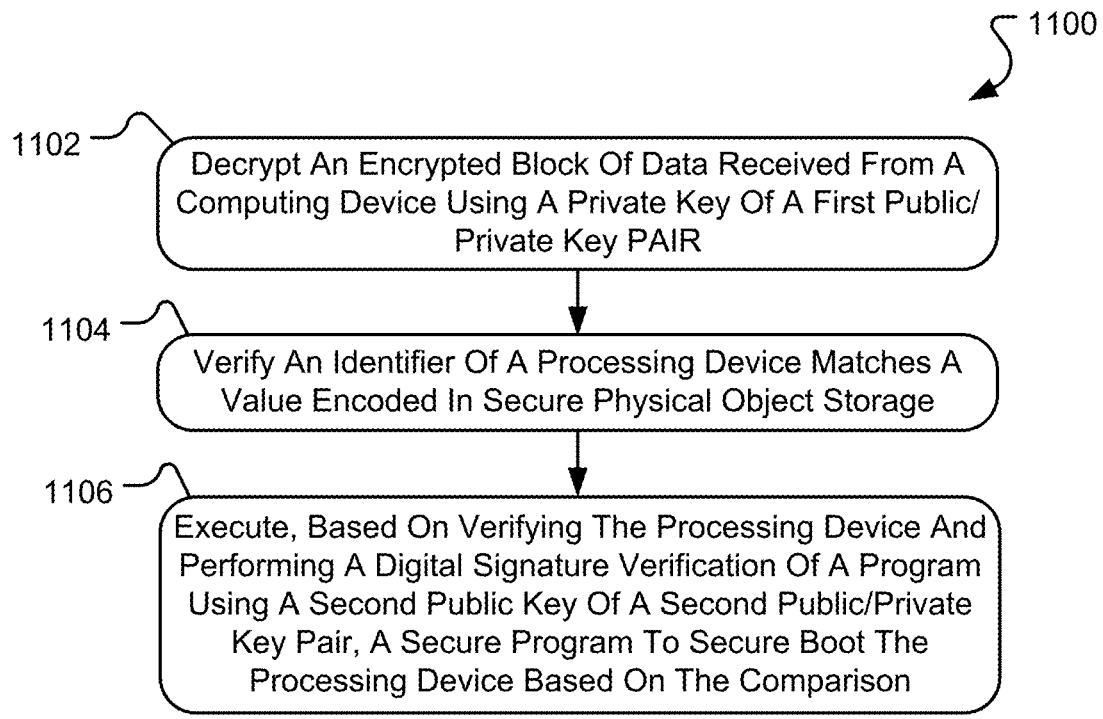
FIG. 11 is a flowchart illustrating an example of a method (or process) for securely operating a computing environment utilizing a secure physical object storage device, in accordance with some examples.

FIG. 11 is a flowchart illustrating an example of a method (or process) 1100 for securely operating a computing environment utilizing a secure physical object storage device, in accordance with some examples. As above, the operations of the method 1100 may be performed or executed by a processing device 202 (such as processing device 202 of computer system 205 described above with reference to FIG. 2) through one or more programs and/or hardware components. At operation 1102, the processing device 202 may decrypt, using a private key of a first public/private key pair, an encrypted block of data received from a first computing device, as described above with reference to operation 420 of FIG. 4B. The first computing device may be remote from the processing device 202 (e.g., communicating with the processing device through a network connection) or may be local to the processing device (e.g., communicating directly with the processing device through an interface or direct link). The processing device may utilize a decryption/encryption symmetric key to decrypt the encrypted block of data. In one example, the encrypted block of data may include at least an identifier of the processing device (e.g., the public identifier value of the processing device, as described above with respect to FIG. 3, FIG. 4B, etc.).

At operation 1104, the processing device may verify that the identifier of the processing device retrieved from the encrypted block of data matches a value encoded on a secure physical object of the processing device. One example may include operation 422 described above with reference to FIG. 4B. The secure physical object may include, but is not limited to, programmable fuses, PUFs, and a lockable non-volatile memory component. At operation 1106, the processing device may authenticate and execute a secure program if the identifier of the processing device retrieved from the encrypted block of data matches a value encoded on a secure physical object of the processing device and a digital signature of the secure program is verified (e.g., secure boot) using the public key of a second public/private key pair (e.g., a session public/private key pair). The second public/private key pair is different from the first public/private key pair. In one example, the hash of the public key corresponding to the public key with which the secure program is authenticated may be included in the encrypted block of data and the verification may include an RSA decrypt using the public key of the second (e.g., session) public/private key pair. The secure program may include a microcode or firmware patch for the processing device and/or a BIOS program.

In some examples, the encrypted block of data may include a hash of a session public key of a session key pair. In such instances, the processing device may match a software verification value from a portion of the secure program to the hash of the session public key of the encrypted block of data, similar to that described above with reference to operation 428 of FIG. 4B. The portion of the secure program may be, in some examples, a header portion of the secure program. Further, the processing device may also train a storage device (such as memory 210 of FIG. 2) in communication with the processing device to store encrypted data from the processing device.

In some examples, the encrypted block of data may include an initial symmetric encryption key, such as the symmetric encryption key discussed above with reference to operation 412 of FIG. 4A. The processing device may obtain the secure program from storage (e.g., non-volatile or volatile storage and memory) in communication with the processing device and decrypting the secure program using the initial symmetric encryption key. The encrypted block of data may additionally or alternatively include a secondary symmetric encryption key as also described above with reference to operation 412 of FIG. 4A. The processing device may encrypt, using the secondary symmetric encryption key, a communication to the first computing device and transmit, over a secure communication channel, the encrypted communication. The processing device may also encrypt, using a symmetric encryption key received from the first computing device, data associated with a second processing device in communication with the processing device and transmit the encrypted data to the second processing device. The encrypted data may be associated with the secure program to control at least one operation of the second processing device.

Figure 12:
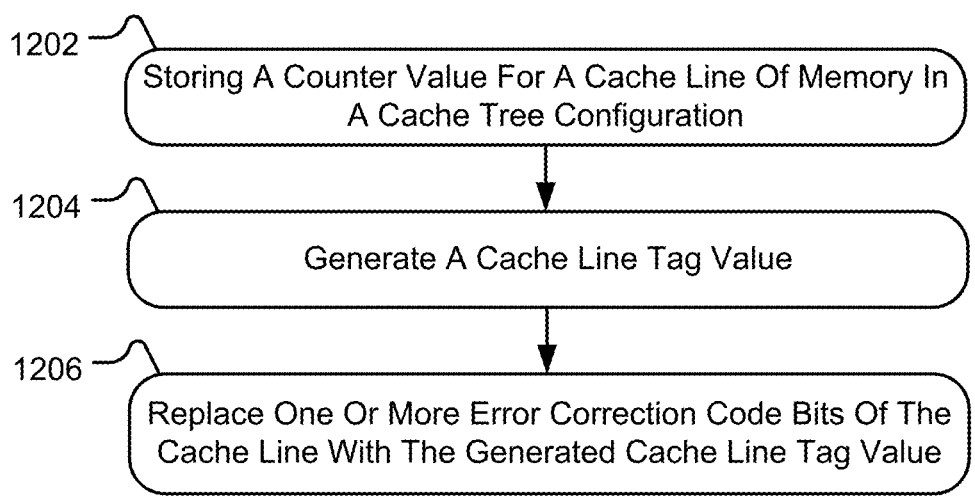
FIG. 12 is a flowchart illustrating an example of a method (or process) for securing data of a computing environment with integrity and anti-replay functionality, in accordance with some examples.

In some examples, the processing device may obtain, from an on-chip memory structure and based on a request received from the first computing device, the identifier of the processing device and transmit the identifier to the first computing device. The identifier may be associated with a public key of a public/private key pair. Further, the processing device may include a central processing unit of a second computing device (e.g., a device of cloud computing environment 102 of FIG. 1) of a cloud computing environment accessible remotely by the first computing device (e.g., customer network 112 or computing device 110 of FIG. 1). In some instances, the processing device may execute a cold reset, as described above with reference to operation 424 of FIG. 4B, if the identifier of the processing device does not match the value encoded based on the secure physical object of the processing device FIG. 12 is a flowchart illustrating an example of a method (or process) for securing data of a computing environment with integrity and anti-replay functionality, in accordance with some examples. As above, the operations of the method 1200 may be performed or executed by the processing device 202 through one or more firmware or software programs and/or hardware components. At operation 1202, the processing device 202 may store a counter value in a cache tree configuration of the memory of the computer system 250, such as that shown in FIG. 6 above. The counter value may be associated with a cache line of data intended to be stored in a memory component (e.g., memory 210) of a computer system 250. At operation 1204, the processing device 202 may generate a cache line tag value through a one-way hash algorithm of the counter value, a plaintext or a ciphertext data block, and a memory address value. Operations 506-510 of FIG. 5 discussed above provide an example of generating the cache line tag value. At operation 1206, the processing device 202 replace one or more stored error correction code (ECC) bits associated with the cache line with the generated cache line tag value. The cache line tag value may therefore be stored in a portion of the memory component (e.g., memory 210) reserved for ECC bit storage. Storage of the cache line tag value in the ECC bits is described in detail above with reference to operation 512 of FIG. 5.

In some examples, a CPU may generate, at the time of a reset (cold and/or warm) a symmetric key to be used for confidentiality (e.g., a 128-bit AES key) and compute an encryption key schedules (10 keys for encryption). Also at RESET times, the CPU generates a group of random numbers to be used in the finite field arithmetic multiplications as part of the integrity tag computation, the size of the group depending on the chosen polynomial (e.g., 8 64-bit random numbers). The CPU may support memory encryption with integrity and anti-replay for a subset of the total memory or for the full memory (CPU firmware with or without a hardware engine may be used to scale the memory encryption with integrity and anti-replay from the subset of the total memory to the full memory if the hardware does not support full memory integrity and anti-replay). In general, the CPU only reads and writes memory in chunks of a given number of bytes (e.g., 64 bytes) which may be referred to as "a cache line" because code and data is cached inside the CPU die in multiple of these cache lines. Initially some or all cache lines corresponding to the memory protected by the hardware engine implementing memory encryption with integrity and anti-replay have a version or counter value of zero (0). Each time a modified (or dirty) cache line is evicted from the CPU to memory, its version or counter value is incremented by 1 and the hardware engine that implements memory encryption with integrity and anti-replay performs these actions.

Continuing the above example, for each of the cache line subsets corresponding to the encryption data width (128 bits for AES 128-bit) (4×128-bits=512 bits=64 bytes=one cache line), the CPU encrypts a plaintext containing the memory physical address of the cache line subset concatenated with the version/counter value using the confidentiality AES encryption key schedule (10 rounds) and generates a ciphertext of the same data width. Further, for each of the cache line subsets, it performs a XOR operation of the corresponding ciphertext computed above with the original confidentiality AES key and a XOR with the corresponding data chunk from the cache line (the actual data to be evicted to the memory from the CPU caches). The CPU may then write the above ciphertexts to the corresponding memory addresses.

In parallel, the CPU may encrypt a single plaintext value containing the memory physical address of the cache line concatenated with the version/counter value using the integrity AES encryption key schedule (10 rounds) and generate a ciphertext of the same data width and generates a ciphertext of the same data width (128 bits in this example). The CPU may then perform a XOR of the above ciphertext with the original integrity AES key and finite field arithmetic multiplications of above cache line data ciphertext with the corresponding random numbers generated at RESET times, the number of multiplications and the size of the data depends on the chosen polynomial (8 multiplications, 1 for each 64-bit of the data ciphertext). The CPU may then XORs the results of all the above multiplications and a (subset) of the ciphertext computed above to generate a cache line integrity tag. The size of the cache line integrity tag may be a subset of the size or the full size of the finite field arithmetic multiplication result size (e.g., 56 bits or 64 bits). The CPU may then write the cache line integrity tag to memory in the ECC portion of the cache line memory address (e.g., ECC is 64 bits).

Figure 13:
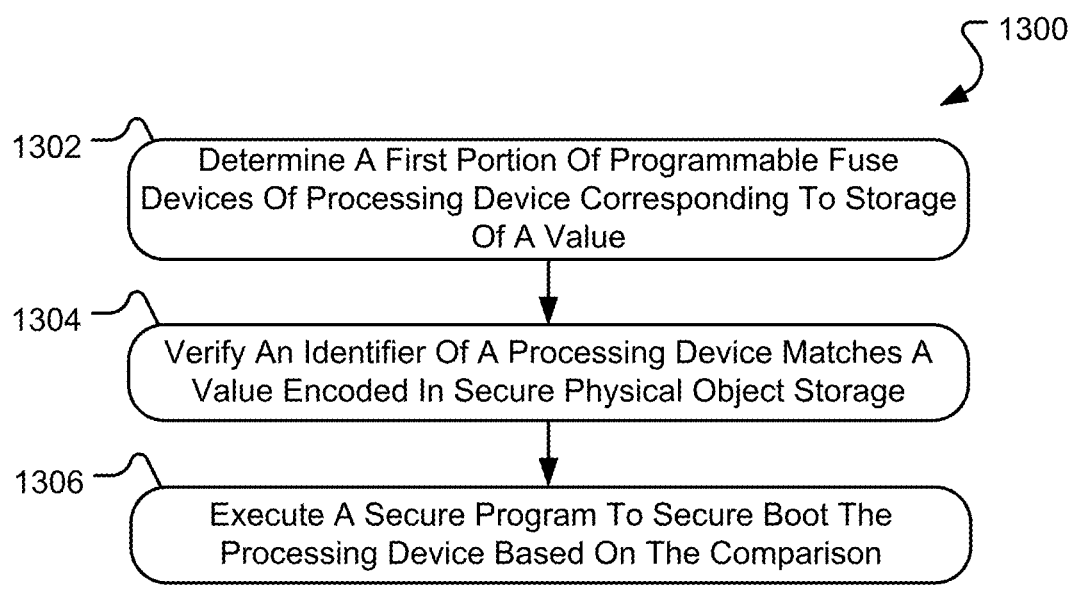
FIG. 13 is a flowchart illustrating an example of a method (or process) for securing a processing device by burning inert fuse devices of the processing device, in accordance with some examples.

Each time a cache line is read from memory by the CPU, the hardware engine that implements memory encryption with integrity and anti-replay may, for each of the cache line subsets corresponding to the encryption data width (128 bits for AES 128-bit) (4×128-bits=512 bits=64 bytes=one cache line), encrypt a plaintext containing the memory physical address of the cache line subset concatenated with the version/counter value using the confidentiality AES encryption key schedule (10 rounds) and generates a ciphertext of the same data width. For each of the cache line subsets, the CPU performs a XOR of the corresponding ciphertext computed above with the original confidentiality AES key and a XOR with the corresponding data chunk from the encrypted cache line read from the memory and, in parallel, encrypts a single plaintext containing the memory physical address of the cache line concatenated with the version/counter value using the integrity AES encryption key schedule (10 rounds) and generates a ciphertext of the same data width and generates a ciphertext of the same data width (128 bits in this example). The CPU may then perform a XOR of the above ciphertext with the original integrity AES key and calculates finite field arithmetic multiplications of cache line data ciphertext read from memory with the corresponding random numbers generated at RESET times, the number of multiplications and the size of the data depends on the chosen polynomial (8 multiplications, 1 for each 64-bit of the data ciphertext). The CPU may then XOR the results of all the above multiplications and a (subset) of the ciphertext computed in step d, this is the computed cache line integrity tag and its size may be a subset of the size or the full size of the finite field arithmetic multiplication result size (e.g., 56 bits or 64 bits) and compare the computed cache line integrity tag with the cache line integrity tag retrieved from the ECC portion of the cache line memory address, the integrity with anti-replay check passes if the tags match FIG. 13 is a flowchart illustrating an example of a method (or process) 1300 for securing a processing device by burning inert fuse devices of the processing device, in accordance with some examples. As above, the operations of the method 1300 may be performed or executed by the processing device 202 through one or more firmware or software programs and/or hardware components. At operation 1302, the processing device or a manufacturer of a processing device may determine a first portion of a plurality of programmable fuse devices of the processing device. As explained above, the processing device may include programmable fuses, which are physical objects made of a material (e.g., metal and/or other material) and embedded in the silicon of the security intelligent controller. The fuses may be one-time programmable to retain an opposite value to the one with which they are manufactured (e.g. fuses manufactured as a logical '0' can only be programmed one time to a logical '1'). The first portion of the plurality of programmable fuse devices may be reserved for storing a value associated with a functionality of the processing device. For instance, the first portion of the plurality of programmable fuse devices may be reserved or programmed (e.g., by burning each of the fuse devices of the first portion to a particular value) to store a value, which can include firmware patching data, an identifier of the processing device, one or more parameters of firmware patching (e.g., the one or more parameters can include a location identifier, a size identifier of a firmware patch, and/or other information), and/or other data.

At operation 1304, the processing device or manufacturer of the processing device may identify a second portion of the plurality of programmable fuse devices. The second portion of the plurality of programmable fuse devices includes the remaining unprogrammed plurality of programmable fuse devices (those fuses that are not included in the first portion of the plurality of programmable fuse devices of the processing device). For instance, the second portion of the plurality of programmable fuse devices that are unprogrammed may be considered "inert" or otherwise not utilized by the processing device. In some cases, the one or more unprogrammed fuse devices are within the first portion of the plurality of programmable fuse devices of the processing device. As explained above, these inert fuses may introduce a security risk for the processing device. Thus, to mitigate against the security risk caused by the unused or inert fuses, the processing device or manufacturer may burn one or more of the unprogrammed fuse devices of the second portion. For instance, the processing device or manufacturer may burn one or more of the unprogrammed fuse devices of the second portion with a preset value that prevents access to the functionality of the processing device through an unauthorized altering of one or more unprogrammed fuse devices of the plurality of programmable fuse devices. In one example, burning one or more of the unprogrammed fuse devices generates an opposing polarity in some or all of the unprogrammed fuse devices. In some aspects, the preset value prevents storing of an undetectable rootkit in the plurality of programmable fuse devices. In some aspects, the preset value causes the unauthorized altering of the unprogrammed fuse device to correspond to a value outside the plurality of programmable fuse devices or to collide with another functionality of the processing device. By burning one or more of the unprogrammed fuse devices, an attack on those fuses may be mitigated.

As a result of burning the one or more of the unprogrammed fuse devices of the processing device, the processing device includes a first portion of a plurality of programmable fuse devices and a second portion of the plurality of programmable fuse devices. The first portion is reserved for storing a value associated with a functionality of the processing device (e.g., storing a firmware patching value associated with the processing device). The second portion includes the remaining programmable fuse devices not of the first portion. As noted above, at least one of the second portion of the plurality of programmable fuse devices is burned with a preset value, which prevents access to a functionality of the processing device through an unauthorized altering of one or more unprogrammed fuse devices of the plurality of programmable fuse devices.

As noted above, in some examples, one or more fuses (or fuse devices) may be utilized by a computing device to store firmware or other software executed by the computing device, to store flags or other settings that, when set, provide access to the computing device by other devices in communication with the computing device, and/or to store other information. In some cases, an attack on the computing device may occur through unauthorized access of the fuses of the computing device. For example, an attacker may burn one or more of the inert (e.g., unprogrammed or unused) fuses (e.g., which were left unprogrammed by the manufacturer) to gain access and control of the computing device. As noted above, an attacker can burn or program the inert fuse(s) to install an undetectable rootkit program into the fuses, allowing the attacker to gain access and control of the computing device. The manufacturer of the computing device may program the inert fuses with specific patterns in order to prevent such attacks that re-enable fuse programming in the field (e.g., after manufacturing, during the supply chain, or after deployment at the customer facility). These patterns may prevent an attacker from inserting malicious configuration combinations or undetectable firmware rootkits in the fuses that would compromise the security of the product.

In one illustrative example, the manufacturer of the computing device may burn all the inert or unused fuses (e.g., program the fuses to the opposite polarity they were manufactured with) allocated to firmware patching via fuses to prevent the undetectable firmware rootkits from being installed in the fuses after the silicon leaves the manufacturing facility. For example, a set of fuses of a processing device may control the location in a fuse array of a firmware patch. In general, processing device firmware patches are firmware programs or data that fix functional or security bugs or add new functionality. Processing device firmware patches can be loaded on a processing device from various media such as memory (for patching done by BIOS or operating systems) or fuses (programmed in manufacturing). In one example, the processing device firmware patch may be stored in fuses by the manufacturer (done during manufacturing/testing of the processing device). For instance, the processing device firmware patch section may be statically allocated with a given number of fuse bits for storage of values or data associated with a firmware patch. This static allocation means that no other piece of functionality can claim the reserved bits for the firmware patch section. In some instances, however, only a subset of the firmware patch section fuses may be used in production, which means the rest of the statically allocated fuses for this section will likely be inert (unprogrammed, considered as a logic zero (0) and never used by the processing device). An attacker may use these inert fuses to launch an attack on the processing device by extending the processing device firmware patch through an attacker programming the inert fuses (as they are all unprogrammed in manufacturing and can be programmed by an attacker to encode whatever firmware instruction it is useful to them to make the attack possible).

In instances in which a set of fuses of a processing device may control the location in the fuse array of a firmware patch, an attacker may burn some of the fuses in the processing device set fuses to a value of one in such a way that the firmware patch is now located in another place of the fuse array that includes inert fuses that the attacker can then program to insert an undetectable rootkit in fuses. To mitigate against such an attack, the processing device manufacturer may determine a group of fuses of the computing device that is associated with firmware patching, identify the fuses of that group that are not used by the computing device, and burn the inert or unused fuses prior to shipping of the device. In another example, the manufacturer can select the set of fuses controlling the location in the fuse array of a firmware patch in such a way that an attacker cannot relocate the firmware patch (e.g., the firmware patch would either reside outside the fuse array or collide with other fuses used for different functionality). In still another example, the inert fuses belonging to the firmware patch in fuses section may be burned with a chosen bitstream such that, if an attacker burns any of the remaining unburned fuses to a value of one, the attacker cannot encode any firmware instructions that are useful in an attack.

By programming the fuses controlling the parameters of the firmware patching, the firmware patch cannot be moved or extended beyond the allocated space by placing the firmware patch between groups of fuse blocks that are used for different pieces of functionality (e.g., enabling/disabling of processing device features, silicon speedpath correction parameters, silicon redundancy control, etc.) and programmed with patterns that do not allow the attack to be carried out. As noted above, the fuse array may contain sections allocated to various pieces of functionality (such as a processing device firmware patch in fuses). The location of the firmware patch in the fuses can be controlled by another set of fuses. If the processing device manufacturer programs this set of fuses in such a way that the entire firmware patch is located between two sections allocated (and programmed) for other pieces of functionality, then the attacker cannot extend the firmware patch as there are no inert fuses allocated to the processing device firmware patch (e.g., the processing device firmware patch section is always of the size of the firmware patch programmed in the fuses during processing device manufacturing).

In some cases, the fuse burning described herein can be achieved through or performed by the security intelligent controller or another on-die logic block during the silicon manufacturing and testing process.

According to at least one example, a method is provided for performing a secure boot process in a computer system. The method can include identifying one or more secure physical objects in a CPU. The CPU can be configured as a root of trust for the secure boot process and the computer system can include the CPU and a non-volatile memory storing BIOS for the secure boot process. The method can further include authenticating the BIOS to perform the secure boot process using a key derivation algorithm based on a key derived from a value encoded using the set of programmable fuses in the CPU.

Implementations of the method can include one or more of the following features and/or one or more features of other aspects. For example, one or more secure physical objects can include one or more programmable fuses, one or more lockable on-chip non-volatile memory units, or one or more physically unclonable functions (PUFs).

In some implementations, the key derivation algorithm is further based in part on a one-way hash of an initialization patch binary image in the BIOS. The initialization patch can be used to perform the key derivation algorithm based on a one-way hash of the value encoded using the set of programmable fuses in the CPU and the one-way hash of the initialization patch binary image.

The CPU can be further configured to support memory traffic encryption with integrity and anti-replay using a secure hypervisor, e.g., by exposing a hardware encryption engine via a control register interface.

In some implementations, the method includes generating a one-way hash of the value encoded using the set of programmable fuses. The key can be derived from the one-way hash of the value encoded using the set of programmable fuses.

In some implementations, the method includes concatenating the value encoded using the set of programmable fuses in the CPU with i) a hash of a public key and ii) a hash of computer code configured (e.g., programmed and/or written) to run on the CPU during the secure boot process. The result of the concatenation can be a combined identity. The computer code can be firmware and/or software (e.g., including BIOS and/or other code), as described above. The public key can be used to authenticate the computer code configured to run on the CPU during the secure boot process. The public key can be an unauthenticated public key.

In some implementations, the method further includes partitioning a memory unit (e.g., a DRAM unit or other memory unit) into an encrypted with integrity and anti-replay memory portion and a plain memory portion (not encrypted with integrity and anti-replay). Data communicated between the CPU and the DRAM unit may be encrypted with integrity and anti-replay.

According to another example, a method can be provided for authenticating a microcode or firmware patch for a CPU. The method can include performing of a secure hash of a CPU manufacturer public key and comparing it against a reference secure hash stored inside the CPU in one or more ROM structures, fuses, or other non-volatile storage. The method may further include performing a digital signature verification using the full public key, comparing of the decrypted hash from the signature against the computed secure hash of the microcode or firmware patch header and body, and comparing of the digital signature padding with the expected values according to a given digital signature verification algorithm definition. The microcode or firmware patch can be double signed by the CPU manufacturer and an OEM or CSP and the microcode or firmware patch authentication may require the digital signature verification of both the CPU manufacturer and the OEM/CSP digital signatures, respectively. The OEM/CSP public key secure hash can be embedded in the CPU die via fuses or other non-volatile storage or can be embedded into a manifest signed by the CPU manufacturer and associated with the public identity of the CPU (e.g., serial number). The microcode or firmware patch can be double signed by the CPU manufacturer and a given confidential computing customer and the microcode or firmware patch authentication will require the digital signature verification of both the CPU manufacturer and the confidential computing customer digital signatures, respectively. The confidential computing customer public key can be securely shared between the customer and the CPU using one of the methods described in the previous sections, such as method 400 of FIGS. 4A-4C.

According to another example, a method can be provided for performing a dynamic secure boot by a security intelligent controller. The security intelligent controller can send, to a third-party, a public identity of the security intelligent controller and receive, from the third-party, encrypted computer code, an encrypted blob, and a copy of a session public key. The security intelligent controller can store the encrypted blob and the encrypted computer code in a memory unit after authenticating the encrypted blob. The method can further include the security intelligent controller performing a digital signature verification of the computer code. The security intelligent controller can load the computer code onto a memory unit, the memory unit being on a same die as the security intelligent controller Implementations of the method can include one or more of the following features and/or one or more features of other aspects. For example, the security intelligent controller can perform a warm reset after storing the encrypted blob and the encrypted computer code in memory. The security intelligent controller can perform the decryption and authentication of the blob and the computer code after the warm reset. The computer code can include a basic input/output system (BIOS), software, firmware, or a software or firmware patch.

In some implementations, the encrypted blob is encrypted using a public key of the security intelligent controller. The encrypted blob can include a copy of the public identity of the security intelligent controller, a hash of a session public key, and two randomly generated symmetric keys.

In some implementations, the security intelligent controller determines that the decrypted copy of the public identity of the security intelligent controller does not match the public identity of the security intelligent controller and the controller can power off/cold reset in response to determining that the decrypted copy of the public identity does not match the public identity.

In some implementations, the security intelligent controller determines that the decrypted hash of the session public key does not match a hash of the copy of the session public key and the controller can power off/cold reset in response to determining that the decrypted hash of the session public key does not match the hash of the copy of the session public key.

In some implementations, the digital signature verification is performed with the the session public key.

According to another example, a method performed by a primary security intelligent controller and one or more additional security intelligent controllers communicatively coupled to the primary security intelligent controller can include training a memory unit to enable encryption of data sent to the memory unit with integrity and anti-replay. The primary security intelligent controller can establish a communication channel between the primary security intelligent controller and a third-party. Data sent and received using the communication channel can be encrypted with integrity and anti-replay using a symmetric encryption/decryption key. The primary security intelligent controller can receive information from the third-party using the communication channel.

In some implementations, the memory device is a security unenlightened device. The security unenlightened device can be a DRAM.

The primary security intelligent controller may send at least a portion of the information to each of the one or more additional security intelligent controllers. Each of the one or more additional security intelligent controllers can perform a dynamic secure boot and train a respective additional memory unit to enable encryption of data sent and received with integrity and anti-replay. Each of the one or more additional security intelligent controllers can establish a respective communication channel between the additional security intelligent controller and the third-party.

Each of the one or more additional security intelligent controllers can receive, using the respective one or more communication channels, one or more additional pairs of asymmetric keys or a symmetric session key.

The primary security intelligent controller can receive computer code from the remote party and send at least a portion of the computer code to each of the one or more additional security intelligent controllers.

The pair of asymmetric keys and the one or more symmetric encryption/decryption keys can each be replaced by a corresponding pair of asymmetric keys or a symmetric encryption/decryption key after a certain number of uses of the keys.

The data sent to and/or stored in the memory device can be sent and/or stored using one or more encrypted cache lines. Each of the one or more encrypted cache lines can include bits that include a respective version number and a respective tag. Each of the one or more encrypted cache lines can include a portion large enough to store one or more ECC bits. The portion can store bits corresponding to the tag of the encrypted cache line.

The primary security intelligent controller can receive a particular encrypted cache line that includes a portion storing bits corresponding to a tag of the particular encrypted cache line and compute a tag for the particular encrypted cache line. The primary security intelligent controller can determine if the tag of the particular encrypted cache line matches the tag computed for the particular encrypted cache line.

If the tag of the particular encrypted cache line does not match the tag computed for the particular encrypted cache line, the primary security intelligent controller can successively flip each bit of the particular encrypted cache line to form a one-bit-flipped particular encrypted cache line. The primary security intelligent controller can compute a tag for the one-bit-flipped particular encrypted cache line and determine if the tag of the particular encrypted cache line matches the tag computed for the one-bit-flipped particular encrypted cache line.

If the tag of the particular encrypted cache line matches the tag computed for the one-bit-flipped particular encrypted cache line, the primary security intelligent controller can replace, in the memory unit, the particular encrypted cache line with the one-bit-flipped particular encrypted cache line.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative Aspects of the Disclosure Include:

Aspect 1: A method for secure computing, the method comprising: decrypting, by a processing device and using a private key of a first public/private key pair, an encrypted block of data received from a first computing device, the encrypted block of data comprising an identifier of the processing device, verifying the identifier of the processing device matches a value encoded based on a secure physical object of the processing device, and executing, by the processing device and based on verifying the identifier of the processing device and performing a digital signature verification of a secure program using the public key of a second (e.g., a session) public/private key pair, the secure program to secure boot the processing device, the second public/private key pair being different from the first public/private key pair.

Aspect 2: The method of aspect 1, wherein the encrypted block of data further comprises a hash of a session public key of a session key pair, the method further comprising matching a software verification value from a portion of the secure program to the hash of the session public key.

Aspect 3: The method of any one of aspects 1 or 2, wherein the portion of the secure program is a header portion.

Aspect 4: The method of any one of aspects 1 to 3, wherein the secure physical object of the processing device comprises at least one of one or more programmable fuses, one or more lockable non-volatile memory units, or one or more physically unclonable functions (PUFs).

Aspect 5: The method of any one of aspects 1 to 4, further comprising training a storage device in communication with the processing device to store encrypted data from the processing device.

Aspect 6: The method of any one of aspects 1 to 5, wherein the encrypted data comprises an a tag value comprising a one-way hash of a counter value, a plaintext or a ciphertext data block, and a memory address value.

Aspect 7: The method of any one of aspects 1 to 5, further comprising partitioning the storage device into an encrypted with integrity and anti-replay memory portion and a non-encrypted with integrity and anti-replay memory portion.

Aspect 8: The method of any one of aspects 1 to 7, wherein the encrypted block of data received from the first computing device further comprises an encryption of the secure program.

Aspect 9: The method of any one of aspects 1 to 8, wherein the encrypted block of data received from the first computing device further comprises an initial symmetric encryption key, the method further comprising obtaining the secure program from a non-volatile storage in communication with the processing device and decrypting, using the initial symmetric encryption key, the secure program.

Aspect 10: The method of any one of aspects 1 to 9, wherein the encrypted block of data further comprises a secondary symmetric encryption key, the method further comprising encrypting, using the secondary symmetric encryption key, a communication to the first computing device and transmitting, over a secure communication channel, the encrypted communication.

Aspect 11: The method of any one of aspects 1 to 10, further comprising encrypting, using a symmetric encryption key received from the first computing device, data associated with a second processing device in communication with the processing device, and transmitting the encrypted data to the second processing device.

Aspect 12: The method of aspect 11 wherein the encrypted data is associated with the secure program to control at least one operation of the second processing device.

Aspect 13: The method of any one of aspects 1 to 12 further comprising obtaining, from an on-chip memory structure and based on a request received from the first computing device, the identifier of the processing device, and transmitting the identifier to the first computing device, the identifier associated with a public key of the first public/private key pair.

Aspect 14: The method of any one of aspects 1 to 13 wherein the secure program comprises a microcode patch or firmware patch for the processing device.

Aspect 15: The method of any one of aspects 1 to 14, wherein the secure program is a Basic Input-Output System (BIOS) program.

Aspect 16: The method of any one of aspects 1 to 15, wherein the processing device comprises a central processing unit of a second computing device of a cloud computing environment accessible remotely by the first computing device.

Aspect 17: The method of any one of aspects 1 to 16, wherein the processing device executes a cold reset if the identifier of the processing device does not match the value encoded based on the secure physical object of the processing device or if the digital signature verification of the secure program fails.

Aspect 18: An apparatus for secure computing, the apparatus comprising a processing device in communication with a non-transitory computer-readable medium in communication with the processing device and encoded with instructions, which when executed, causes the processing device to: decrypt, using a private key of a first public/private key pair, an encrypted block of data received from a first computing device, the encrypted block of data comprising an identifier of the processing device, verify the identifier of the processing device matches a value encoded based on a secure physical object of the processing device, and execute, based on verifying the identifier of the processing device and performing a digital signature verification of a secure program using the public key of a second (e.g., a session) public/private key pair, the secure program to secure boot the processing device.

Aspect 19: The apparatus of aspect 18, wherein the encrypted block of data further comprises a hash of a session public key of a session key pair, the instructions further causing the processing device to match a software verification value from a portion of the secure program to the hash of the session public key.

Aspect 20: The apparatus of aspect 19, wherein the portion of the secure program is a header portion.

Aspect 21: The apparatus of any one of aspects 18 to 20, wherein the secure physical object of the processing device comprises at least one of one or more programmable fuses, one or more lockable non-volatile memory units, or one or more physically unclonable functions (PUFs).

Aspect 22: The apparatus of any one of aspects 18 to 21, the instructions further causing the processing device to train a storage device in communication with the processing device to store encrypted data from the processing device.

Aspect 23: The apparatus of aspect 22, wherein the encrypted data comprises a tag value comprising a one-way hash of a counter value, a plaintext or a ciphertext data block, and a memory address value.

Aspect 24: The apparatus of either aspect 22 or 23, the instructions further causing the processing device to partition the storage device into an encrypted with integrity and anti-replay memory portion and a non-encrypted with integrity and anti-replay memory portion.

Aspect 25: The apparatus of any one of aspects 18 to 24, wherein the encrypted block of data received from the first computing device further comprises an encryption of the secure program.

Aspect 26: The apparatus of any one of aspects 18 to 25, wherein the encrypted block of data received from the first computing device further comprises an initial symmetric encryption key, the instructions further causing the processing device to obtain the secure program from a non-volatile storage in communication with the processing device and decrypt, using the initial symmetric encryption key, the secure program.

Aspect 27: The apparatus of any one of aspects 18 to 26, wherein the encrypted block of data further comprises a secondary symmetric encryption key, the instructions further causing the processing device to encrypt, using the secondary symmetric encryption key, a communication to the first computing device and transmit, over a secure communication channel, the encrypted communication.

Aspect 28: The apparatus of any one of aspects 18 to 27, the instructions further causing the processing device to encrypt, using a symmetric encryption key received from the first computing device, data associated with a second processing device in communication with the processing device and transmit the encrypted data to the second processing device.

Aspect 29: The apparatus of aspect 28, wherein the encrypted data is associated with the secure program to control at least one operation of the second processing device.

Aspect 30: The apparatus of any one of aspects 18 to 29, the instructions further causing the processing device to obtain, from an on-chip memory structure and based on a request received from the first computing device, the identifier of the processing device and transmit the identifier to the first computing device, the identifier associated with a public key of the first public/private key pair.

Aspect 31: The apparatus of any one of aspects 18 to 30, wherein the secure program comprises a microcode patch or firmware patch for the processing device.

Aspect 32: The apparatus of any one of aspects 18 to 31, wherein the secure program is a Basic Input-Output System (BIOS) program.

Aspect 33: The apparatus of any one of aspects 18 to 32, wherein the processing device comprises a central processing unit of a second computing device of a cloud computing environment accessible remotely by the first computing device.

Aspect 34: The apparatus of any one of aspects 18 to 33, wherein the processing device executes a cold reset if the identifier of the processing device does not match the value encoded based on the secure physical object of the processing device or if the digital signature verification of the secure program fails.

Aspect 35: A method for secure data management in a computing device, the method comprising encrypting, by a processing device, a counter value corresponding to a cache line of a memory component, storing, in a cache tree configuration, the encrypted counter value, generating a cache line tag value based on a one-way hash of the counter value, a plaintext or a ciphertext data block, and a memory address value, and replacing one or more stored error correction code (ECC) bits associated with the cache line with the generated cache line tag value.

Aspect 36: The method of aspect 35, further comprising concatenating the counter value with a memory address value, encrypting the concatenated counter value and memory address value using a confidentiality encryption key to generate an encrypted confidentiality counter block, and combining the encrypted confidentiality counter block with data bits of the cache line to generate one or more bits of a ciphertext.

Aspect 37: The method of aspect 36, wherein the one-way hash comprises encrypting the concatenated counter value and a memory address value with an integrity encryption key to generate an integrity counter block, transforming one or more bits of the ciphertext data block using a function comprising a finite field multiplication with one or more randomly generated numbers by the computing device, and combining at least a portion of the integrity counter block with at least a portion of the transformed ciphertext data block using a function (e.g., the function comprising an eXclusive OR (XOR) function).

Aspect 38: The method of any one of aspects 35 to 37 wherein the counter value and the cache line tag value each comprise 64 bits of data.

Aspect 39: The method of any one of aspects 35 to 38, wherein the cache tree configuration comprises at least one cache memory device embodied on the processing device.

Aspect 40: The method of any one of aspects 35 to 39, further comprising retrieving, from a memory in communication with the processing device, a stored ciphertext of data and an associated cache line tag, computing an expected cache line tag value based on the one-way hash factoring the counter value, a cache line address, and the retrieved ciphertext of data, and comparing the expected cache line tag value with the cache line tag retrieved from the memory.

Aspect 41: The method of aspect 40, further comprising based on the computed cache line tag not matching the cache line tag retrieved from a memory and associated with the ciphertext, altering the stored ciphertext of data at least in part by modifying at least one bit of the stored ciphertext of data and an associated cache line tag, computing the expected cache line tag value based on the one-way hash factoring the counter value, the cache line address, and the retrieved ciphertext of data, and comparing the expected cache line tag value with the cache line tag retrieved from the memory.

Aspect 42: The method of aspect 41, further comprising verifying, based on comparing the expected cache line tag value of the altered ciphertext of data with the cache line tag retrieved from the memory the stored ciphertext of data as valid.

Aspect 43: The method of any one of aspects 35 to 42, further comprising storing the cache line tag value in an ECC cache memory device.

Aspect 44: An apparatus for secure data management in a computing device, the apparatus comprising a processing device in communication with a non-transitory computer-readable medium in communication with the processing device and encoded with instructions, which when executed, causes the processing device to: store, in a cache tree configuration, a counter value corresponding to a cache line of a memory component, generate a cache line tag value based on a one-way hash of the counter value, a plaintext or a ciphertext data block, and a memory address value, and replace one or more stored error correction code (ECC) bits associated with the cache line with the generated cache line tag value.

Aspect 45: The apparatus of aspect 44, the instructions further causing the processing device to concatenate the counter value with a memory address value, encrypt the concatenated counter value and memory address value using a confidentiality encryption key to generate an encrypted confidentiality counter block, and combine the encrypted confidentiality counter block with data bits of the cache line plaintext to generate one or more bits of a ciphertext.

Aspect 46: The apparatus of aspect 45, wherein the one-way hash comprises encrypting the concatenated counter value and a memory address value with an integrity encryption key to generate an integrity counter block, transforming one or more bits of the ciphertext data block using a function comprising a finite field multiplication with one or more randomly generated numbers by the computing device, and combining at least a portion of the integrity counter block with at least a portion of the transformed ciphertext data block using a function (e.g., the function comprising an eXclusive OR (XOR) function).

Aspect 47: The apparatus of any one of aspects 44 to 46, wherein the counter value and the cache line tag value each comprise 64 bits of data.

Aspect 48: The apparatus of any one of aspects 44 to 47, wherein the cache tree configuration comprises at least one cache memory device embodied on the processing device.

Aspect 49: The apparatus of any one of aspects 44 to 48, wherein the cache tree configuration further comprises at least one memory device outside the processing device, the at least one memory device storing an encrypted counter value associated with at least one cache line of a memory region encrypted with integrity and anti-replay.

Aspect 50: The apparatus of aspect 49, wherein the processing device further encrypts at least one evicted counter value from the cache tree with integrity and anti-replay, and copies a resulting ciphertext and an evicted cache line tag value to the at least one memory device outside the processing device.

Aspect 51: The apparatus of aspect 50, wherein the at least one memory device outside of the processing device comprises separate regions to store a ciphertext and a cache line tag value of a cache line associated with a data block and the resulting ciphertext and evicted cache line tag value.

Aspect 52: The apparatus of any one of aspects 44 to 51, the instructions further causing the processing device to retrieve, from a memory in communication with the processing device, a stored ciphertext of data and an associated cache line tag, compute an expected cache line tag value based on the one-way hash factoring the counter value, a cache line address, and the retrieved ciphertext of data, and compare the expected cache line tag value with the cache line tag retrieved from the memory.

Aspect 53: The apparatus of aspect 52, the instructions further causing the processing device to: based on the computed cache line tag not matching the cache line tag retrieved from a memory and associated with the ciphertext, alter the stored ciphertext of data at least in part by modifying at least one bit of the stored ciphertext of data, compute the expected cache line tag value based on the one-way hash factoring the counter value, the cache line address, and the altered ciphertext of data, and compare the expected cache line tag value with the cache line tag retrieved from the memory Aspect 54: The apparatus of aspect 53, the instructions further causing the processing device to verify, based on the comparison of the expected cache line tag value of the altered ciphertext of data with the cache line tag retrieved from the memory , the stored ciphertext of data as valid.

Aspect 55: The apparatus of any one of aspects 44 to 54, the instructions further causing the processing device to store the cache line tag value in an ECC cache memory device.

Aspect 56: A method for mitigating an attack on a processing device, the method comprising determining a first portion of a plurality of programmable fuse devices of the processing device, the first portion of the plurality of programmable fuse devices reserved for storing a value associated with a functionality of the processing device and burning at least one unprogrammed fuse device of the plurality of programmable fuse devices with a preset value, wherein the preset value prevents access to the functionality of the processing device through an unauthorized altering of one or more unprogrammed fuse devices of the plurality of programmable fuse devices.

Aspect 57: The method of aspect 56, wherein the first portion of the plurality of programmable fuse devices is reserved for storing firmware patching data.

Aspect 58: The method of either of aspect 56 or 57, wherein the first portion of the plurality of programmable fuse devices is reserved for storing one or more parameters of firmware patching, the one or more parameters comprising one of a location identifier or a size identifier of a firmware patch.

Aspect 59: The method of any one of aspects 56 to 58, wherein the first portion of the plurality of programmable fuse devices is reserved for storing an identifier of the processing device.

Aspect 60: The method of any one of aspects 56 to 59, wherein burning the at least one unprogrammed fuse devices generates an opposing polarity in each of the unprogrammed fuse devices.

Aspect 61: The method of any one of aspects 56 to 60, wherein burning the at least one unprogrammed fuse device comprises burning each unprogrammed fuse device of the plurality of programmable fuse devices not of the first portion.

Aspect 62: The method of any one of aspects 56 to 61, wherein the preset value prevents storing of an undetectable rootkit in the plurality of programmable fuse devices.

Aspect 63: The method of any one of aspects 56 to 62, wherein the one or more unprogrammed fuse devices are within the first portion of the plurality of programmable fuse devices of the processing device.

Aspect 64: The method of any one of aspects 56 to 63 wherein the preset value causes the unauthorized altering of the unprogrammed fuse device to correspond to a value outside the plurality of programmable fuse devices or to collide with another functionality of the processing device.

Aspect 65: A processing device comprising a first portion of a plurality of programmable fuse devices, the first portion reserved for storing a value associated with a functionality of the processing device and a second portion of the plurality of programmable fuse devices, the second portion comprising the remaining programmable fuse devices not of the first portion, wherein at least one of the second portion of the plurality of programmable fuse devices is burned with a preset value, wherein the preset value prevents access to a functionality of the processing device through an unauthorized altering of one or more unprogrammed fuse devices of the plurality of programmable fuse devices.

Aspect 66: The processing device of aspect 65, wherein the first portion of the plurality of programmable fuse devices is reserved for storing firmware patching data.

Aspect 67: The processing device of either aspect 65 or 66, wherein the first portion of the plurality of programmable fuse devices is reserved for storing one or more parameters of firmware patching, the one or more parameters comprising one of a location identifier or a size identifier of a firmware patch.

Aspect 68: The processing device of any one of aspects 65 to 67, wherein the first portion of the plurality of programmable fuse devices is reserved for storing an identifier of the processing device.

Aspect 69: The processing device of any one of aspects 65 to 68, wherein burning the at least one unprogrammed fuse devices generates an opposing polarity in each of the unprogrammed fuse devices.

Aspect 70: The processing device of any one of aspects 65 to 69, wherein the preset value prevents storing of an undetectable rootkit in the plurality of programmable fuse devices.

Aspect 71: The processing device of any one of aspects 65 to 70, wherein the one or more unprogrammed fuse devices are within the first portion of the plurality of programmable fuse devices of the processing device.

Aspect 72: The processing device of any one of aspects 65 to 71, wherein the preset value causes the unauthorized altering of the unprogrammed fuse device to correspond to a value outside the plurality of programmable fuse devices or to collide with another functionality of the processing device.

Aspect 73: A non-transitory computer-readable medium having stored thereon instructions that, when executed by one or more processors, cause the one or more processors to perform any of the operations of methods 1 to 72.

We claim:

1. A method for secure computing, the method comprising:
   decrypting, by a processing device and using a private key of a first public/private key pair, an encrypted block of data received from a first computing device, the encrypted block of data comprising an identifier of the processing device and a hash of a session public key of a session key pair;
   verifying the identifier of the processing device matches a value encoded based on a secure physical object of the processing device;
   matching a software verification value from a portion of a secure program to the hash of the session public key; and
   executing, by the processing device and based on verifying the identifier of the processing device, the matching of the software verification value to the hash of the session public key, and performing a digital signature verification of secure program using a public key of a second public/private key pair, the secure program to secure boot the processing device, the second public/private key pair being different from the first public/private key pair.

2. The method of claim 1, wherein the portion of the secure program is a header portion.

3. The method of claim 1, wherein the secure physical object of the processing device comprises at least one of one or more programmable fuses, one or more lockable non-volatile memory units, or one or more physically unclonable functions (PUFs).

4. The method of claim 1, further comprising:
   training a storage device in communication with the processing device to store encrypted data from the processing device.

5. The method of claim 4, wherein the encrypted data comprises a tag value comprising a one-way hash of a counter value, a plaintext or a ciphertext data block, and a memory address value.

6. The method of claim 4, further comprising:
   partitioning the storage device into an encrypted with integrity and anti-replay memory portion and a non-encrypted with integrity and anti-replay memory portion.

7. The method of claim 1, wherein the encrypted block of data received from the first computing device further comprises an encryption of the secure program.

8. The method of claim 1, wherein the encrypted block of data received from the first computing device further comprises an initial symmetric encryption key, the method further comprising:
   obtaining the secure program from a non-volatile storage in communication with the processing device; and
   decrypting, using the initial symmetric encryption key, the secure program.

9. The method of claim 1, wherein the encrypted block of data further comprises a secondary symmetric encryption key, the method further comprising:
   encrypting, using the secondary symmetric encryption key, a communication to the first computing device; and
   transmitting, over a secure communication channel, the encrypted communication.

10. The method of claim 1, further comprising:
    encrypting, using a symmetric encryption key received from the first computing device, data associated with a second processing device in communication with the processing device; and
    transmitting the encrypted data to the second processing device.

11. The method of claim 10, wherein the encrypted data is associated with the secure program to control at least one operation of the second processing device.

12. The method of claim 1, further comprising:
    obtaining, from an on-chip memory structure and based on a request received from the first computing device, the identifier of the processing device; and
    transmitting the identifier to the first computing device, the identifier associated with a public key of the first public/private key pair.

13. The method of claim 1, wherein the secure program comprises a microcode patch or firmware patch for the processing device.

14. The method of claim 1, wherein the secure program is a Basic Input-Output System (BIOS) program.

15. The method of claim 1, wherein the processing device comprises a central processing unit of a second computing device of a cloud computing environment accessible remotely by the first computing device.

16. The method of claim 1, wherein the processing device executes a cold reset if the identifier of the processing device does not match the value encoded based on the secure physical object of the processing device or if the digital signature verification of the secure program fails.

17. A processing device coupled to at least one memory, the processing device configured to:
    decrypt, using a private key of a first public/private key pair, an encrypted block of data received from a first computing device, the encrypted block of data comprising an identifier of the processing device and a hash of a session public key of a session key pair;
    verify the identifier of the processing device matches a value encoded based on a secure physical object of the processing device;
    match a software verification value from a portion of a secure program to the hash of the session public key; and execute, based on verifying the identifier of the processing device, the matching of the software verification value to the hash of the session public key, and performing a digital signature verification of a secure program using a public key of a second public/private key pair, the secure program to secure boot the processing device, the second public/private key pair being different from the first public/private key pair.

18. The processing device of claim 17, wherein the portion of the secure program is a header portion.

19. The processing device of claim 17, wherein the secure physical object of the processing device comprises at least one of one or more programmable fuses, one or more lockable non-volatile memory units, or one or more physically unclonable functions (PUFs).

20. The processing device of claim 17, the processing device configured to:
train a storage device in communication with the processing device to store encrypted data from the processing device.

21. The processing device of claim 20, wherein the encrypted data comprises a tag value comprising a one-way hash of a counter value, a plaintext or a ciphertext data block, and a memory address value.

22. The processing device of claim 20, the processing device configured to:
partition the storage device into an encrypted with integrity and anti-replay memory portion and a non-encrypted with integrity and anti-replay memory portion.

23. The processing device of claim 17, wherein the encrypted block of data received from the first computing device further comprises an encryption of the secure program.

24. The processing device of claim 17, wherein the encrypted block of data received from the first computing device further comprises an initial symmetric encryption key, the processing device configured to:
obtain the secure program from a non-volatile storage in communication with the processing device; and
decrypt, using the initial symmetric encryption key, the secure program.

25. The processing device of claim 17, wherein the encrypted block of data further comprises a secondary symmetric encryption key, the processing device configured to:
encrypt, using the secondary symmetric encryption key, a communication to the first computing device; and
transmit, over a secure communication channel, the encrypted communication.

26. The processing device of claim 17, the processing device configured to:
encrypt, using a symmetric encryption key received from the first computing device, data associated with a second processing device in communication with the processing device; and
transmit the encrypted data to the second processing device.

27. The processing device of claim 26, wherein the encrypted data is associated with the secure program to control at least one operation of the second processing device.

28. The processing device of claim 17, the processing device configured to:
obtain, from an on-chip memory structure and based on a request received from the first computing device, the identifier of the processing device; and
transmit the identifier to the first computing device, the identifier associated with a public key of the first public/private key pair.

29. The processing device of claim 17, wherein the secure program comprises a microcode patch or firmware patch for the processing device.

30. The processing device of claim 17, wherein the secure program is a Basic Input-Output System (BIOS) program.

31. The processing device of claim 17, comprising a central processing unit of a second computing device of a cloud computing environment accessible remotely by the first computing device.

32. The processing device of claim 17, the processing device configured to execute a cold reset if the identifier of the processing device does not match the value encoded based on the secure physical object of the processing device or if the digital signature verification of the secure program fails.

* * * * *